(12) United States Patent
Pham et al.

(10) Patent No.: US 11,055,566 B1
(45) Date of Patent: Jul. 6, 2021

(54) UTILIZING A LARGE-SCALE OBJECT DETECTOR TO AUTOMATICALLY SELECT OBJECTS IN DIGITAL IMAGES

(71) Applicant: Adobe Inc., San Jose, CA (US)

(72) Inventors: Khoi Pham, Hyattsville, MD (US);
Scott Cohen, Sunnyvale, CA (US); Zhe Lin, Fremont, CA (US); Zhihong Ding, Fremont, CA (US); Walter Wei Tuh Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/817,418

(22) Filed: Mar. 12, 2020

(51) Int. Cl.
*G06K 9/00* (2006.01)
*G06K 9/62* (2006.01)

(52) U.S. Cl.
CPC .......... *G06K 9/623* (2013.01); *G06K 9/6259* (2013.01); *G06K 9/6261* (2013.01)

(58) Field of Classification Search
CPC .... G06K 9/623; G06K 9/6261; G06K 9/6259; G06K 9/38; G06K 9/40; G06T 7/0081; G06T 7/0083; G06T 5/001; G06T 5/20; G06T 5/50; G06T 2207/20144; G06T 2207/10016; H04N 5/21
See application file for complete search history.

(56) References Cited

U.S. PATENT DOCUMENTS

| | | | |
|---|---|---|---|
| 6,389,168 B2 * | 5/2002 | Altunbasak | G06K 9/00711 382/224 |
| 6,469,706 B1 | 10/2002 | Syeda-Nahmood | |
| 8,107,726 B2 * | 1/2012 | Xu | G06T 7/162 382/173 |
| 8,385,688 B2 * | 2/2013 | Gong | G06T 7/187 382/294 |
| 8,818,024 B2 * | 8/2014 | Chen | G06K 9/4671 382/103 |
| 9,129,191 B2 | 9/2015 | Cohen et al. | |
| 9,171,230 B2 * | 10/2015 | Jiang | G06K 9/00362 |
| 9,576,223 B2 * | 2/2017 | Aupetit | G06F 16/93 |

(Continued)

FOREIGN PATENT DOCUMENTS

| | | |
|---|---|---|
| CN | 103366178 A | 10/2013 |
| CN | 107563494 A | 1/2018 |
| WO | WO 2017/007626 A1 | 1/2017 |

OTHER PUBLICATIONS

Combined Search and Examination Report as received in UK Application GB2005865.7 dated Jan. 11, 2021.

(Continued)

*Primary Examiner* — Amir Alavi
(74) *Attorney, Agent, or Firm* — Keller Jolley Preece

(57) ABSTRACT

The present disclosure relates to an object selection system that automatically detects and selects objects in a digital image utilizing a large-scale object detector. For instance, in response to receiving a request to automatically select a query object with an unknown object class in a digital image, the object selection system can utilize a large-scale object detector to detect potential objects in the image, filter out one or more potential objects, and label the remaining potential objects in the image to detect the query object. In some implementations, the large-scale object detector utilizes a region proposal model, a concept mask model, and an auto tagging model to automatically detect objects in the digital image.

20 Claims, 20 Drawing Sheets

(56) References Cited

U.S. PATENT DOCUMENTS

| | | | |
|---|---|---|---|
| 9,619,488 | B2 | 4/2017 | Ambardekar et al. |
| 9,720,934 | B1* | 8/2017 | Dube .................. G06K 9/46 |
| 9,746,981 | B2* | 8/2017 | Zachut ............... G06F 3/03545 |
| 9,858,496 | B2 | 1/2018 | Sun et al. |
| 10,146,751 | B1* | 12/2018 | Zhang ................. G06F 40/284 |
| 10,192,129 | B2 | 1/2019 | Price et al. |
| 10,216,766 | B2 | 2/2019 | Lin et al. |
| 10,496,880 | B2* | 12/2019 | Ye ....................... G06K 9/00771 |
| 10,713,794 | B1 | 7/2020 | He et al. |
| 10,740,647 | B2 | 8/2020 | Du et al. |
| 10,893,283 | B2* | 1/2021 | Chen ..................... H04N 19/14 |
| 2003/0179213 | A1 | 9/2003 | Liu |
| 2003/0198380 | A1 | 10/2003 | Shin et al. |
| 2003/0233224 | A1 | 12/2003 | Marchisio et al. |
| 2008/0069444 | A1 | 3/2008 | Wilensky |
| 2009/0281925 | A1 | 11/2009 | Winter et al. |
| 2010/0158412 | A1 | 6/2010 | Wang et al. |
| 2010/0166321 | A1 | 7/2010 | Sawant et al. |
| 2011/0026835 | A1 | 2/2011 | Ptucha et al. |
| 2011/0029553 | A1 | 2/2011 | Bogart et al. |
| 2011/0085739 | A1 | 4/2011 | Zhang et al. |
| 2013/0257886 | A1 | 10/2013 | Kerofsky et al. |
| 2014/0334722 | A1 | 11/2014 | Bloore et al. |
| 2015/0169142 | A1 | 6/2015 | Longo et al. |
| 2015/0170005 | A1 | 6/2015 | Cohen et al. |
| 2015/0213058 | A1 | 7/2015 | Ambardekar et al. |
| 2015/0228086 | A1 | 8/2015 | Maurer et al. |
| 2015/0379006 | A1 | 12/2015 | Dorner et al. |
| 2016/0342863 | A1 | 11/2016 | Kwon et al. |
| 2017/0017696 | A1 | 1/2017 | Alonso |
| 2017/0083752 | A1 | 3/2017 | Saberian et al. |
| 2017/0140236 | A1 | 5/2017 | Price et al. |
| 2017/0206431 | A1 | 7/2017 | Sun et al. |
| 2017/0255378 | A1 | 9/2017 | Desai |
| 2017/0287137 | A1 | 10/2017 | Lin et al. |
| 2018/0108137 | A1 | 4/2018 | Price et al. |
| 2018/0267997 | A1 | 9/2018 | Lin et al. |
| 2019/0019318 | A1 | 1/2019 | Cinnamon et al. |
| 2019/0108250 | A1 | 4/2019 | Miller et al. |
| 2019/0130229 | A1 | 5/2019 | Lu et al. |
| 2019/0252002 | A1* | 8/2019 | Ding .................. G06K 9/00744 |
| 2019/0354609 | A1 | 11/2019 | Huang et al. |
| 2020/0020108 | A1 | 1/2020 | Pao et al. |
| 2020/0218931 | A1 | 7/2020 | Karlinsky et al. |
| 2020/0334487 | A1 | 10/2020 | Du et al. |
| 2020/0334501 | A1 | 10/2020 | Lin et al. |
| 2021/0027448 | A1 | 1/2021 | Cohen et al. |
| 2021/0027471 | A1 | 1/2021 | Cohen et al. |
| 2021/0027497 | A1 | 1/2021 | Ding et al. |

OTHER PUBLICATIONS

U.S. Appl. No. 15/921,492, Apr. 2, 2020, Notice of Allowance.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. vol. 1908. International Society for Optics and Photonics, 1993. (Year: 1993).
Wan et al, Deep Learning for Content-Based Image Retrieval: Comprehensive Study, Published in MM '14: Proceedings of the ACM International Conference on Multimedia: Nov. 3-7, 2014, Orlando. pp. 157-166. http://doi.org/10.1145/2647868.2654948 (Year: 2014).
Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. In Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.
Combined Search and Examination Report as received in United Kingdom Application GB2005714.7 dated Sep. 3, 2020.
J. Uijlings, K. van de Sande, T. Gevers, and A. Smeulders. Selective Search For Object Recognition, IJCV, 2013.
Joseph Redmon, Santosh Divvala, Ross Girshick, Ali Farhadi: You Only Look Once: Unified, Real-Time Object Detection, arXiv:1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
U.S. Appl. No. 15/921,492, Dec. 27, 2019, Office Action.
Combined Search and Examination Report as received in United Kingdom Application GB2005704.8 dated Sep. 24, 2020.
Combined Search and Examination Report as received in United Kingdom Application GB2004362.6 dated Nov. 13, 2020.
Intention to Grant as received in United Kingdom Application GB1817588.5 dated Aug. 13, 2020.
U.S. Appl. No. 16/518,880, Apr. 7, 2021, Notice of Allowance.
U.S. Appl. No. 16/518,810, Apr. 16, 2021, 1st Action Offfice Action.
U.S. Appl. No. 16/518,795, May 6, 2021, Office Action.
U.S. Appl. No. 16/518,850, Apr. 6, 2021, Preinterview 1st Office Action.

* cited by examiner

UTILIZING A LARGE-SCALE OBJECT DETECTOR TO AUTOMATICALLY SELECT OBJECTS IN DIGITAL IMAGES

BACKGROUND

Recent years have witnessed a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables digital image editing without significant lag time or processing delays. Similarly, improvements in software enable individuals to modify, combine, filter, or otherwise edit digital images. Examples of editing digital images include detecting an object, copying the object from one image into a new background, or removing an object from an image.

Notwithstanding these improvements in digital image editing, conventional systems have a number of problems in relation to flexibility, accuracy, and efficiency of operation with respect to image editing systems, and in particular, with respect to detecting and selecting objects in digital images. To illustrate, many conventional systems have limited functionality in the types of objects they can detect in an image. For example, many conventional systems are often limited to a small number of object classes. Further, many conventional systems primarily detect only a small subset of objects within an object class. Indeed, many conventional systems poorly handle less common objects, object categories, and object parts, which are largely not covered by object detectors of these conventional systems.

In addition, conventional systems are often inaccurate and inefficient. To illustrate, many conventional systems that provide object detection often identify the wrong objects or worse, altogether fail to identify any object in an image. As mentioned above, many conventional systems often fail to identify objects that do not belong to well-known object classes. Alternatively, some conventional systems incorrectly recognize an object term and return an incorrect object. In either case, the conventional systems provide the user with incorrect, imprecise, and inaccurate results. When a conventional system provides an inaccurate result, the conventional system wastes computer processing resources and real-time memory.

These, along with additional problems and issues exist in image editing systems with respect to detecting and selecting objects in digital images.

BRIEF SUMMARY

Implementations of the present disclosure provide benefits and/or solve one or more of the foregoing or other problems in the art with systems, non-transitory computer-readable media, and methods for automatically selecting objects in a digital image corresponding to unknown classes utilizing a large-scale object detector. In particular, in response to receiving a request to select a query object with an unknown object class in a digital image, the disclosed systems can utilize a large-scale object detector to detect potential objects in the image, reduce the number of potential objects using a filtering scheme, and label the remaining potential objects in the image to detect the query object. In some implementations, the large-scale object detector includes a region proposal model, a concept mask model, and an auto tagging model. In this manner, the disclosed systems can accurately and efficiently detect and automatically select objects belonging to unknown object classes.

The following description sets forth additional features and advantages of one or more implementations of the disclosed systems, computer media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
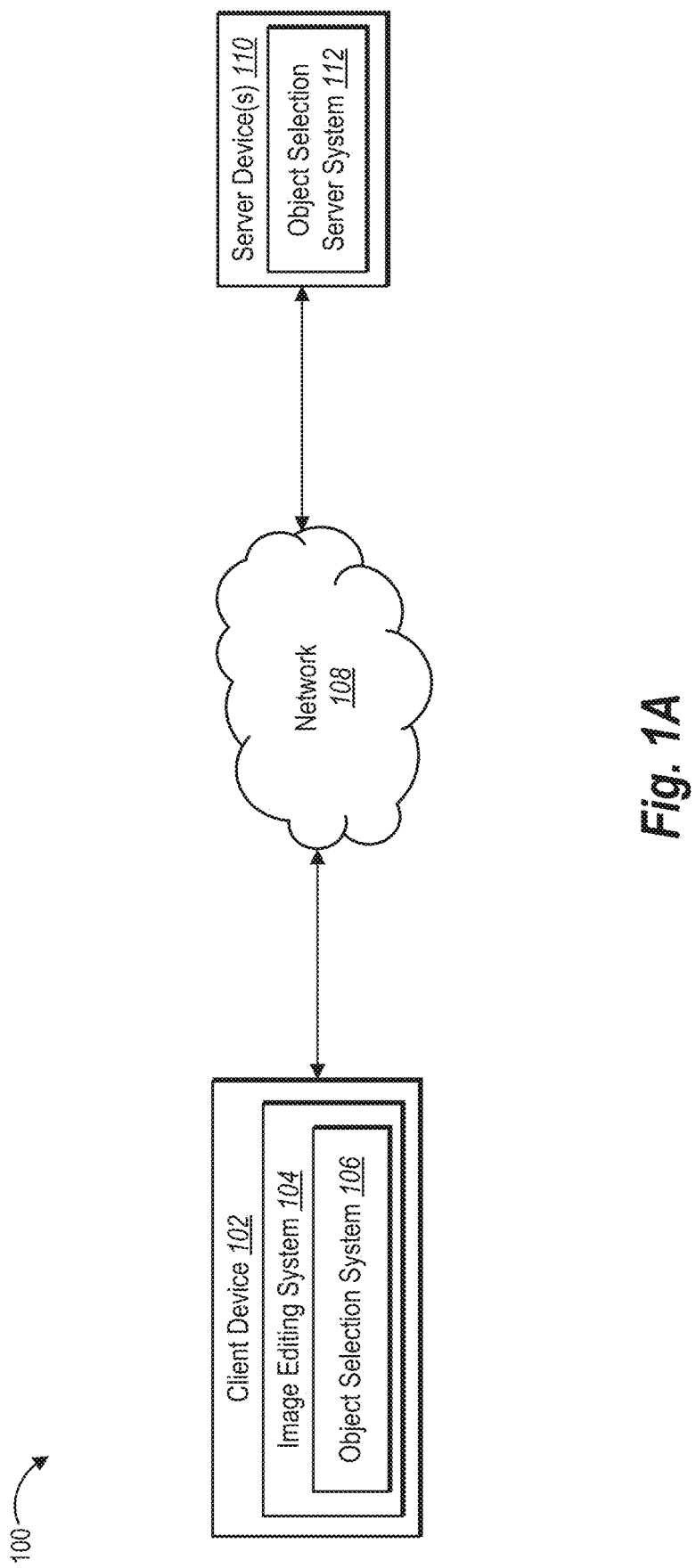
FIG. 1A illustrates a schematic diagram of system environment in which an object selection system can operate in accordance with one or more implementations.

This disclosure describes one or more implementations of an object selection system that automatically detects and selects user-requested objects (e.g., query objects) in a digital image utilizing a large-scale object detector. For instance, the object selection system utilizes a large-scale object detector to detect objects within a digital image for which there is not another object detector in an object selection pipeline specifically trained to detect. In some implementations, utilizing the large-scale object detector includes identifying region proposals corresponding to proposed objects within the digital image, filtering one or more of the region proposals, and tagging the filtered region proposals. The object selection system can then determine which tagged region proposal(s) corresponds to the query object. The object selection system can then generate an object mask for each detected instance of the query object in the image.

More specifically, in one or more implementations, the object selection system receives a request (i.e., an object selection request) to detect a query object in a digital image. For instance, the request includes a query string that indicates a query object to be automatically selected by the object selection system. In response to determining that there is not an object detector trained to select the query object type, the object selection system can generate region proposals for objects in the digital image. Additionally, the object selection system can filter the region proposals to identify a subset of filtered region proposals. Next, the object selection system can generate labels for the filtered subset utilizing an auto tagging model. Further, the object selection system can detect the query object from the filtered subset based on the generated labels. Moreover, the object selection system can automatically select the query object within the digital image and provide it to a user in response to the object selection request.

As mentioned above, the object selection system can utilize the large-scale object detector to detect unrecognized or unknown objects within a digital image. In other words, the object selection system can utilize the large-scale object detector to detect objects for which there is not an object detector in the object selection pipeline specifically trained to detect. Indeed, the object selection system can utilize the large-scale object detector as a catch-all object detector within an object selection pipeline. For example, the object selection pipeline can determine whether a query object corresponds to a specialist object class, known object class, a category-based object class, or an unknown object class.

Additionally, depending on the object class determination, the object selection system can select and utilize a corresponding object detector to detect the query object. In instances when the query object corresponds to an unknown object class, the object selection system can utilize the large-scale object detector, as further described herein. Additional detail regarding an object selection pipeline is provided in FIG. 1B below.

As mentioned above, in one or more implementations, the object selection system can utilize a region proposal model (e.g., a machine-learning model or a heuristic-based model) as part of the large-scale object detector. For example, the region proposal model is trained to utilize region proposal methods to analyze the digital image and discover potential objects within the digital image. Further, the region proposal model can generate an approximate boundary (e.g., a bounding box) for each potential object discovered. In some implementations, the region proposal model can also divide the digital image into smaller sections and analyze each section separately to be able to better detect potential objects within the digital image.

In various implementations, the object selection system can decrease the number of discovered potential objects. For example, the object selection system can remove one or more region proposals based on a filtering scheme. To illustrate, in some implementations, the large-scale object detector includes a concept mask model that generates a heat map (e.g., a concept mask) of the digital image that indicates areas that likely include the query object indicated in the query string. For instance, in one or more embodiments, the heat map or concept mask is a binary attention mask that indicates areas in the digital image that potentially contain the query object. By combining the potential objects (i.e., from the region proposals) with the concept mask, the object selection system can identify a smaller subset of potential objects, as further described below.

In alternative implementations, the object selection system employs other types of filtering schemes. For example, the object selection system filters out potential objects based on overlapping region proposals. As another example, the object selection system compares the potential objects to the output of a different object detection model (e.g., a model other than a concept mask model) that also discovers potential objects within the digital image.

In one or more implementations, the object selection system can add region proposals based on results of the concept mask model. For example, if the concept mask model identifies areas in the digital image indicating the potential presence of the query object, the object selection system can generate a region proposal (e.g., bounding box) in that area of the digital image. In various implementations, the object selection system can add the new region proposal to the filtered subset of region proposals after applying the filtering scheme.

As mentioned above, the object selection system can tag or label the potential objects (i.e., region proposals). For instance, in various implementations, the large-scale object detector can include an auto tagging model that generates object labels (e.g., tags) for each of the potential objects. For example, the object selection system can provide an image of each potential object to the auto tagging model, which analyzes the image segment and outputs object labels for the potential object. In some implementations, the object selection system can enlarge the area around the image of the potential object to provide the auto tagging model with additional image context information, which can result in generating more accurate object labels.

Because the filtered subset of potential objects includes fewer potential objects, the object selection system can generate labels for the remaining potential objects more quickly and efficiently. In some implementations, however, the object selection system can omit filtering and generate labels for each of the originally discovered potential objects to detect the query object from among the potential objects.

As just mentioned, the object selection system can determine the query object based on the object labels (e.g., tags). For example, the object selection system compares the query object with the labels to determine if a tagged object detected in the digital image matches the query object. In some implementations, the object selection system can also utilize a mapping table to identify a synonym of the query object that matches an object label. When a match is detected, the object selection system can generate an object mask for the detected query object and provide the query object with the object mask within the digital image.

As previously mentioned, the object selection system provides numerous advantages, and benefits over conventional systems via a practical application (e.g., automatically selecting objects with unknown object classes within images utilizing a large-scale object detector). For example, the object selection system can automatically select objects in a digital image in response to user input requesting the selection of a query object in a digital image. Further, the large-scale object detector can detect objects across a wide array of object classes, including unknown object classes. Indeed, the object selection system can utilize the large-scale object detector to detect objects that conventional systems would otherwise not detect, or only detect using unnecessary amounts of computing resources. Accordingly, the object selection system provides increased flexibility, improved efficiency, and expanded functionality over conventional systems.

To illustrate, the object selection system provides increased flexibility by detecting objects that are unrecognizable or that do not belong to a known object class. For example, the object selection system can recognize objects in a user request that do not correspond to known object classes or object categories. In this manner, the object selection system can flexibly extend the range and scope of objects that are able to be detected via the large-scale object detector.

Additionally, the object selection system provides improved efficiency over conventional systems. For example, in various implementations, the object selection system utilizes a concept mask model and/or another object recognition model in connection with a region proposal model (i.e., region proposal methods and/or algorithms) to reduce the number of potential objects from a digital image. As a result, the object selection system can detect the query object from the remaining potential objects using fewer computations and less real-time memory.

Further, the object selection system provides increased accuracy over conventional systems. For instance, the object selection system improves object detection accuracy by better identifying objects. Indeed, if a conventional system does not recognize an object term, the conventional system largely is unable to detect the object. Alternatively, the conventional systems utilize a generic object detection network that often returns the wrong object or an imprecise selection of the object. In contrast, by utilizing the large-scale object detector (e.g., the methods and/or algorithms utilized by the large-scale object detector) described herein, the object selection system can accurately detect and provide requested objects.

Additionally, the object selection system significantly reduces the number of actions that many conventional systems require of users to select an object within an image. Rather than the user using inefficient mouse input-based tools to manually select an object, the user "tells" (e.g., provides verbal cues in a natural language object selection query or query string) the object selection system which object to select and the object selection system automatically detects and accurately selects the object. Indeed, the object selection system greatly simplifies the object selection process to one or two simple actions to achieve precise results by the user rather than a large number of steps previously required to only achieve mediocre results.

Additional advantages and benefits of the object selection system will become apparent in view of the following description. Further, as illustrated by the foregoing discussion, the present disclosure utilizes a variety of terms to describe features and advantages of the object selection system. Before describing the object selection system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various implementations, an image editing system displays an image on a computing device, such as a client device. In additional implementations, the image editing system enables a user to modify or change an image as well as generate new images. For example, the image editing system enables a user to copy an object selected in a first image over the background of a second image. Additionally, a digital image can include one or more frames in a video or animation along with other digital images.

The term "object," as used herein, refers to a visual representation of a subject, concept, or sub-concept in an image. In particular, an object refers to a set of pixels in an image that combine to form a visual depiction of an item, article, partial item, component, or element. An object can correspond to a wide range of classes and concepts. For example, objects include specialty objects, object categories (e.g., conceptual objects), object classes, objects from known-classes, and unknown object classes (e.g., objects not used in training any of the object detection neural networks).

In some implementations, an object includes multiple instances of the object. For example, an image of a rose bush includes multiple instances of roses or the object term of "furniture" can include the sub-groupings of a chair, desk, and couch. In one or more implementations, an object includes sub-objects, parts, or portions. For example, a person's face or leg can be objects that are part of another object (e.g., the person's body). As another example, a shirt is an object that can be part of another object (e.g., a person).

As mentioned above, in some implementations, the object selection system can accurately detect and automatically select an object within an image based on a query string. As used herein, the term "query string," refers to a text string of one or more object terms (i.e., words) that indicates a target object. A query string can be natural language user input that includes a noun representing a query object. In addition, a query string can include object terms for other objects that have a relationship with the query object. In general, the object selection system receives a query string when a user requests the object selection system to automatically select an object in an image. In some implementations, the query string is submitted as a text string. In alternative implementations, the object selection system detects alternative user input, such as voice data, and converts the alternative user input into text to obtain the query string.

As just mentioned, a query string can include a query object. The term "query object" refers to the object in the query string that is being requested by the user for detection and selection. For example, a noun in the query string indicates the query object. Largely, if a query string includes multiple objects (e.g., multiple nouns), the query object is the first listed object. In additional implementations, the query string includes additional words, such as adjectives and adverbs that indicate attributes of the query object. Further, as noted above, the query string can include other nouns (and corresponding attributes) that indicate a relationship to the query object.

As used herein, the terms "object mask," "segmentation mask," or "object segmentation" refer to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

In addition, the terms "concept mask," "heat map," or "attention mask" refer to an image mask that indicates potential objects within an image. For example, a concept mask indicates possible areas and locations in the digital image where potential objects may reside based on detected visual-semantic embeddings. In one or more implementations, the concept mask indicates areas in the digital image where the query object potentially resides. To illustrate, in some implementations, a concept mask is a binary mask. For example, a concept mask can include positive pixels (e.g., a binary value of 1) in areas where the query object potentially is detected and negative pixels (e.g., a binary value of 0) in areas where the query object is not potentially detected. In many implementations, a concept mask model generates a concept mask from an input image and an input concept (e.g., the query object).

Indeed, in various implementations, the object selection system generates a concept mask (e.g., a heatmap) by indicating, for each pixel of the image, how likely the pixels is to include an object that corresponds to an object concept (e.g., an input concept). In some implementations, the value of the pixels is between 0-100 (or another range) and pixels above an potential object concept threshold (e.g., 50%) are designated as positive and pixels below the potential object concept threshold are designated as negative in the concept mask. In one or more implementations, the concept mask does not distinguish between instances of objects.

As used herein, the term "approximate boundary" refers to an indication of an area including an object that is larger and/or less accurate than the object itself. In one or more implementations, an approximate boundary can include at least a portion of a query object and portions of the image not comprising the query object. An approximate boundary can include any shape, such as a square, rectangle, circle, oval, or other outline surrounding an object. In one or more implementations, an approximate boundary comprises a bounding box. Indeed, an approximate boundary can include a compact area of the image that may contain an object.

Moreover, an approximate boundary can also encompass potential objects. As used herein, the term "potential object" refers to the area or portion of an image that potentially includes an object or at least a portion of an object (e.g., a sub-object or object part). In one or more embodiments, the object selection system utilizes a region proposal neural network to detect regions or areas of an image that include potential objects. Further, the object selection system can indicate a detected potential object by capturing the area of the image within an approximate boundary, called a region proposal.

As used herein, the term "region proposal" refers to an indicated portion or segment of an image that includes a potential object. A region proposal can identify an object having a known or unknown object class. In some implementations, a region proposal can be represented as an approximate boundary (e.g., a bounding box) around a potential object. Often, a region proposal is not labeled as it is identifying potential objects in an image, including objects with an unknown object class. In many implementations, a region proposal model (e.g., a region proposal machine-learning model, a region proposal heuristic model and/or a region proposal neural network) utilizes region proposal methods and/or algorithms to generates region proposals. In some implementations, an object detection model or an object proposal model, or portions thereof, generates region proposals within an image.

As mentioned above, the object selection system can utilize machine learning and various neural networks in various implementations. The term "machine-learning model" refers to a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data. The term machine-learning model can include linear regression models, logistical regression models, random forest models, support vector machines (SVG) models, neural networks, or decision tree models. Thus, a machine-learning model can make high-level abstractions in data by generating data-driven predictions or decisions from the known input data.

Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, an category-based object detection neural network, a concept mask neural network, and/or an auto tagging neural network), data-based models (e.g., a natural language processing model, a large-scale object detection model, an unknown object class detection model, an object recognition model, a filtering model, and/or a selection object attribute model), or a combination of networks and models.

As used herein, the term "neural network" refers to a machine learning model that includes interconnected artificial neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), residual learning neural network, recurrent neural network (RNN), graph neural network, generative adversarial neural network (GAN), Region-CNN (R-CNN), Faster R-CNN, Mask R-CNN, and single-shot detect (SSD) networks.

Referring now to the figures, FIG. 1A illustrates a schematic diagram of an environment 100 in which the object selection system 106 can operate in accordance with one or more implementations. As shown in FIG. 1A, the environment 100 includes a client device 102 and a server device 110 connected via a network 108. Additional detail regarding computing devices (e.g., the client device 102 and the server device 110) is provided below in connection with FIG. 10. In addition, FIG. 10 also provides additional detail regarding networks, such as the illustrated network 108.

Although FIG. 1A illustrates a particular number, type, and arrangement of components within the environment 100, various additional environment configurations are possible. For example, the environment 100 can include any number of client devices. As another example, the server device 110 can represent a set of connected server devices. As a further example, the client device 102 may communicate directly with the server device 110, bypassing the network 108 or utilizing a separate and/or an additional network.

As shown, the environment 100 includes the client device 102. In various implementations, the client device 102 is associated with a user (e.g., a user client device), such as a user that requests automatic selection of an object in an image. The client device 102 can include an image editing system 104 and an object selection system 106. In various implementations, the image editing system 104 implements the object selection system 106. In alternative implementations, the object selection system 106 is separate from the image editing system 104. While the image editing system 104 and the object selection system 106 are shown on the client device 102, in some implementations, the image editing system 104 and the object selection system 106 are located remotely from the client device 102 (e.g., on the server device 110), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more implementations, the image editing system 104 operates in connection with digital design applications or other image editing applications.

In some implementations, the image editing system 104 provides an intelligent image editing assistant that performs one or more automatic image editing operations for the user. For example, the image editing system 104 receives a natural language object selection query (or query string) that inputs, "make the red dress yellow," "blur the background and make it gray," or "increase the contrast on the water." As part of fulfilling the request, the image editing system 104 utilizes the object selection system 106 to automatically select the corresponding query object identified in the query string. The image editing system 104 can then utilize additional system components (e.g., a color replacement tool, a blur filter, or an image adjustment tool) to perform the requested operation with respect to the detected query object.

As mentioned above, the image editing system 104 includes the object selection system 106. As described in detail below, the object selection system 106 accurately detects and automatically selects objects in an image based on the input of an object selection request (e.g., a user-provided query string). The object selection system 106 can utilize the large-scale object detector to detect the query object. For example, the large-scale object detector is part of an object selection pipeline used to detect objects in images based on their corresponding object classes and based on whether the object class is known or unknown.

As shown, the environment 100 also includes the server device 110. The server device 110 includes an object selection server system 112. For example, in one or more implementations, the object selection server system 112 represents and/or provides similar functionality as described herein in connection with the object selection system. In some implementations, the object selection server system 112 supports the object selection system 106 on the client device 102. Indeed, in one or more implementations, the server device 110 can include all, or a portion of, the object selection system 106. In particular, the object selection system 106 on the client device 102 can download an application from the server device 110 (e.g., an image editing application from the object selection server system 112) or a portion of a software application.

In some implementations, the object selection server system 112 can include a web hosting application that allows the client device 102 to interact with content and services hosted on the server device 110. To illustrate, in one or more implementations, the client device 102 accesses a web page supported by the server device 110, which hosts the models that allow for automatic selection of objects in images based on the user providing a query string via the client device 102. As another example, the client device 102 includes an image editing application that provides the image and the query string to the object selection server system 112 on the server device 110, which then detects the query object utilizing the large-scale object detector and provides an object mask of the detected query object back to the client device 102. Then, utilizing the object mask, the image editing application on the client device 102 selects the detected query object.

Figure 1B:
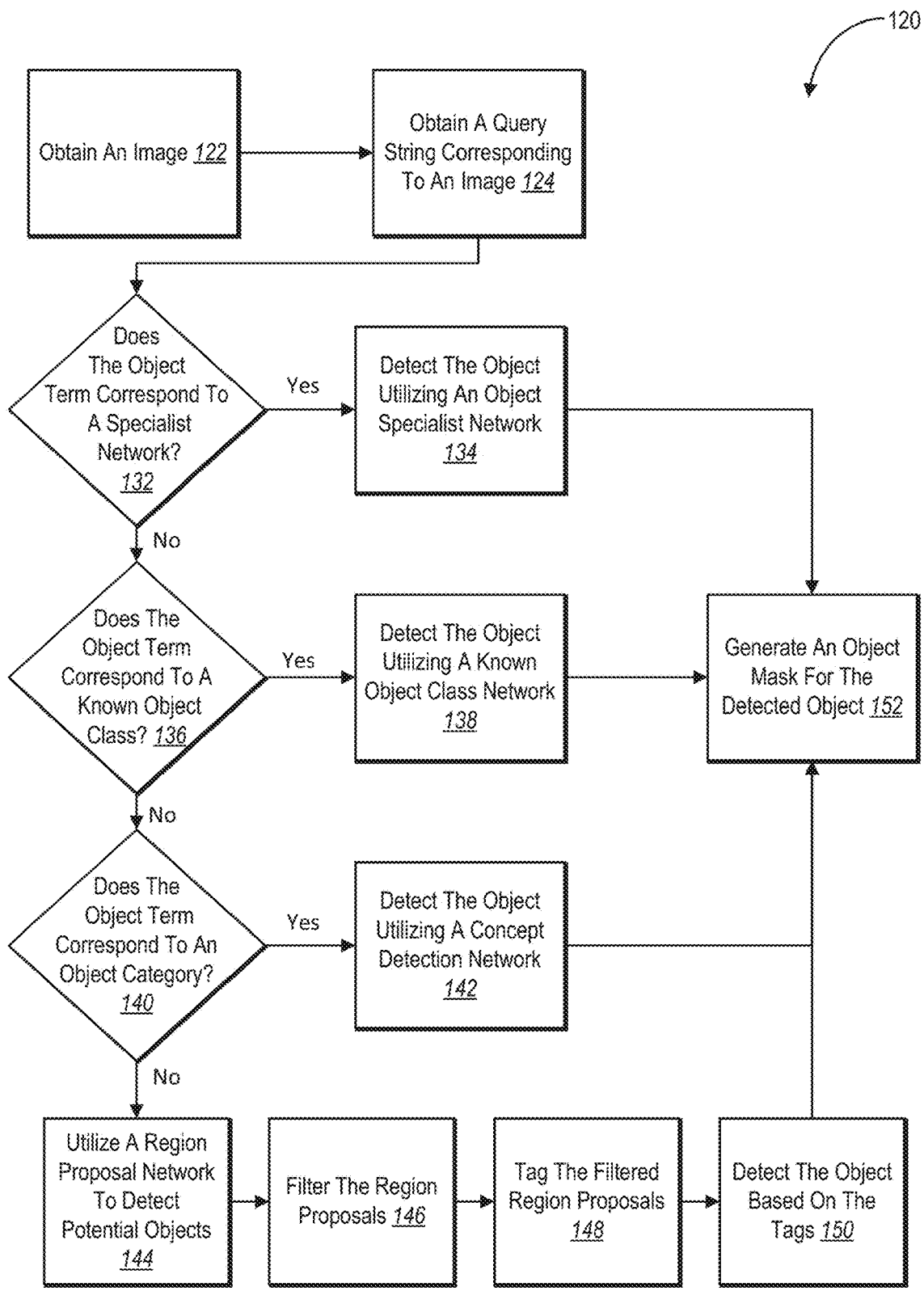
FIG. 1B illustrates a schematic diagram of an object selection pipeline in accordance with one or more implementations.

As mentioned above, FIG. 1B illustrates an example implementation of the object selection pipeline. In particular, FIG. 1B illustrates a schematic diagram of an object selection pipeline 120 in accordance with one or more implementations. In various implementations, the object selection system 106 performs actions included in the object selection pipeline 120. In alternative implementations, an image editing system and/or image editing application can perform one or more of the included actions.

As shown, the object selection pipeline 120 includes an act 122 of the object selection system 106 obtaining an image (i.e., a digital image). For example, an image is loaded into an image editing application, as previously described. In general, the image includes one or more objects. For instance, the image can include background objects (i.e., scenery), foreground objects (i.e., image subjects), and/or other types of objects.

As shown, the object selection pipeline 120 includes an act 124 of the object selection system 106 obtaining a query string corresponding to the image. For example, the object selection system 106 provides an object selection interface where a user can enter one or more words (e.g., user input) indicating the query object that they would like the object selection system to automatically select. As described above, in some implementations, the object selection system 106 can enable alternative forms of user input, such as audio input telling the object selection system 106 to select an object in the image.

As shown, the object selection pipeline 120 includes an act 132 of the object selection system 106 determining whether the object term (e.g., the object term or the alternative object term) corresponds to a specialist network. If a specialty network exists for the query object, the object selection system 106 can identify a particular specialist network based on the query object. For instance, the object selection system 106 can compare the object term to multiple specialist object detection neural networks to identify a specialist object detection neural network that best corresponds to the object. For example, for the object term of "sky," the object selection system 106 can identify that a sky specialist object detection neural network is best suited to identify and select the query object.

As shown in the act 134, the object selection system 106 can detect the object (e.g., based on the object term or alternative object term) utilizing the identified specialized network. More specifically, the object selection system 106 can utilize the identified specialized object detection neural network to locate and detect the object within the image. For instance, the object selection system 106 can utilize the specialized object detection neural network to generate an approximate boundary (e.g., a bounding box) around the detected object in the image. In some implementations, if multiple instances of the object are included in the image, the object selection system 106 can utilize the specialized object detection neural network to separately identify each instance of the multiple instances.

In one or more implementations, an object specialist network can include a body parts specialist object detection neural network and/or a clothing specialist detection neural network. Additional detail regarding utilizing specialized object detection neural networks is found in U.S. patent application Ser. No. 16/518,880, "Utilizing Object Attribute Detection Models To Automatically Select Instances Of Detected Objects In Images," filed on Jul. 19, 2019, which is hereby incorporated by reference in its entirety.

As shown, the object selection pipeline 120 includes the act 152, which receives the output from the act 134 along with the output of acts 138, 142, and 150. The act 152 includes the object selection system 106 generating an object mask for the detected object. In some instances, the act 152 includes the object selection system 106 utilizing an object mask neural network. For example, in various implementations, the object selection system 106 can provide an approximate boundary (e.g., a bounding box) to an object mask neural network, which generates a mask for the detected query object. If multiple bounding boxes are provided, the object selection system 106 can utilize the object mask neural network to generate multiple object masks from the multiple bounding boxes (e.g., one object mask for each instance of the detected query object).

In generating an object mask for a detected object (or each detected object instance), the object mask neural network can segment the pixels in the detected object from the other pixels in the image. For example, the object mask neural network can create a separate image layer that sets the pixels corresponding to the detected object to positive (e.g., binary 1) while setting the remaining pixels in the image to a neutral or negative (e.g., binary 0). When this object mask layer is combined with the image, only the pixels of the detected object are visible. Indeed, the generated object mask can provide a segmentation that enables the selection of the detected object within the image. The object mask neural network can correspond to one or more deep neural networks or models that select an object based on approximate boundary (e.g., bounding box) parameters corresponding to the object within an image.

Returning to FIG. 1B, if in the act 132, the object selection system 106 determines that the object does not correspond to a specialist network, the object selection system 106 can make an additional determination regarding the object. As shown, the object selection pipeline 120 includes the act 136 of the object selection system 106 determining whether the object term (e.g., the object term or the alternative object term) corresponds to a known object class. For example, in various implementations, the object selection system 106 utilizes an object detection neural network trained to detect objects belonging to a number of known object classes. Accordingly, the object selection system 106 can compare object class of the object (e.g., based on the object term or an alternative object term) to the known object classes to determine if the object is part of the known object classes. If so, the object selection system 106 can proceed to the act 138 of the object selection pipeline 120. Otherwise, the object selection system 106 can proceed to the act 140 of the object selection pipeline 120, described further below.

As just mentioned, the object selection pipeline 120 includes the act 138 of the object selection system 106 detecting the object utilizing a known object class network. Known object classes can include object classes tagged in training images and used to train an object detection neural network. Accordingly, based on detecting that the object is associated with a known object class, the object selection system 106 can utilize a known object class detection neural network to optimally detect the object with respect to accuracy and efficiency. Further, the object selection system 106 can provide the detected object to the object mask neural network to generate an object mask (e.g., the act 152), as described above. Additional detail regarding the act 138 is provided with respect to previously mentioned U.S. patent application Ser. No. 16/518,880, "Utilizing Object Attribute Detection Models To Automatically Select Instances Of Detected Objects In Images," filed on Jul. 19, 2019.

If the object selection system 106 determines that the object does not correspond to a specialist network (e.g., the act 132) or a known object class (e.g., the act 136), the object selection system 106 can make an additional determination. To illustrate, the object selection pipeline 120 includes the act 140 of the object selection system 106 determining whether the object term (e.g., object term or an alternative object term) corresponds to an object category (e.g., uncountable objects such as water, a road, and a ceiling). If the object term corresponds to an object category, the object selection system 106 determines to utilize concept-based object detection techniques to detect the object, as described below.

To illustrate, the object selection pipeline 120 includes an act 142 of the object selection system 106 detecting the object utilizing a concept detection network (i.e., a concept-based object detection neural network and/or panoptic semantic segmentation neural network). In general, a concept detection network can include an object detection neural network trained to detect objects based on concepts, background scenery, and other high-level descriptions of objects (e.g., semantics). Additional detail regarding the act 138 is provided with respect to previously mentioned U.S. patent application Ser. No. 16/518,880, "Utilizing Object Attribute Detection Models To Automatically Select Instances Of Detected Objects In Images," filed on Jul. 19, 2019.

As shown in FIG. 1B, the object selection system 106 provides the object detected by the concept detection network to the object mask neural network to generate an object mask of the detected object (i.e., the act 152). For example, the object selection system 106 provides the detected sematic area of an object concept within the image. As mentioned above, the object mask neural network can generate a segmentation of the detected object, which the object selection system 106 utilizes as a selection of the detected object.

Up to this point in the object selection pipeline 120, the object selection system 106 has been able to detect objects corresponding to known object classes. Indeed, utilizing the object term or an alternative object term, the object selection system 106 has been able to map the object term to an object detection model trained to detect the object term. However, while the list of known object classes often numbers in the tens of thousands, in some instances, the object selection system 106 does not recognize an object class. Nevertheless, the object selection system 106 can further extend object recognition capabilities by detecting objects of unknown categories. In this manner, the object selection system 106 can add additional layers to the object selection pipeline 120 to facilitate the detection of unknown objects.

To illustrate, if the object selection system 106 determines in the act 140 that the query object is not part of a known object category, the object selection system 106 can detect the query object using a series of additional neural networks and models. In a number of embodiments, the series of additional neural networks and models (e.g., the acts 144-150) are included within a large-scale object detection network, as described with respect to FIGS. 3A-6C.

As shown, the object selection pipeline 120 includes the act 144 of the object selection system 106 utilizing a regional proposal network to detect potential objects (i.e., candidate objects). For example, the regional proposal network can detect objects in the image. In some implementations, the region proposal network generates an approximate boundary (e.g., a bounding box) around each potential object detected in the image. Additional detail regarding regional proposal networks is provided below with respect to FIGS. 4A-4C.

Additionally, as shown, the object selection pipeline 120 includes the act 146 of the object selection system 106 filtering the region proposals. For example, the object selection system 106 compares the region proposals (e.g., potential objects) to a concept mask of the image or to other potentially objects detected utilizing another object detection model. Additional detail regarding generating a set of filtered region proposals is provided below with respect to FIGS. 5A-5B. Further, in some implementations, the object selection system 106 skips the act 146 and proceeds directly to the act 148.

As shown, the object selection pipeline 120 includes an act 148 of the object selection system 106 tagging the filtered region proposals. For example, the object selection system 106 utilizes an auto tagging model to generate tags and/or labels for the region proposal remaining in the set of filtered region proposals. Additional detail tagging filtered region proposals is provided below with respect to FIGS. 6A-6C.

Further, as shown, the object selection pipeline 120 includes an act 150 of the object selection system 106 detecting the object (i.e., query object) based on the tags. For example, the object selection system 106 compares the label of the query object (e.g., the word or object term used to indicate the query object in the query string) with the tags of the filtered region proposals to determine whether one or more tags match the query object label. Additional detail regarding detecting the query object from tags or labels is provided below with respect to FIG. 3B.

As shown in connection with the 150 of the object selection pipeline 120, once the object selection system 106 detects the object, the object selection system 106 generating an object mask for the detected object (i.e., the act 152). Further, the object selection system 106 can provide the selected object (or selected instance of the object) to a client device associated with a user. For example, the object selection system 106 can automatically select the object within the image for the user within the image editing application mentioned above.

As described above, the object selection pipeline 120 includes various components that the object selection system 106 utilizes to detect a query object. Additionally, many of the components are interchangeable with updated versions as well as new components. Accordingly, when faults occur, the object selection system 106 can identify and update the source of the fault. In addition, the object selection system 106 can also add further components to the object selection pipeline to improve the performance of the detected objects in images. Additional detail regarding modifying and updating the object selection pipeline 120 with interchangeable modules is found in U.S. patent application Ser. No. 16/518,880, which is referenced above, and U.S. patent application Ser. No. 16/800,415, "Utilizing Natural Language Processing And Multiple Object Detection Models To Automatically Select Objects In Images," filed on Feb. 25, 2020, which is hereby incorporated by reference in its entirety.

Figure 2:
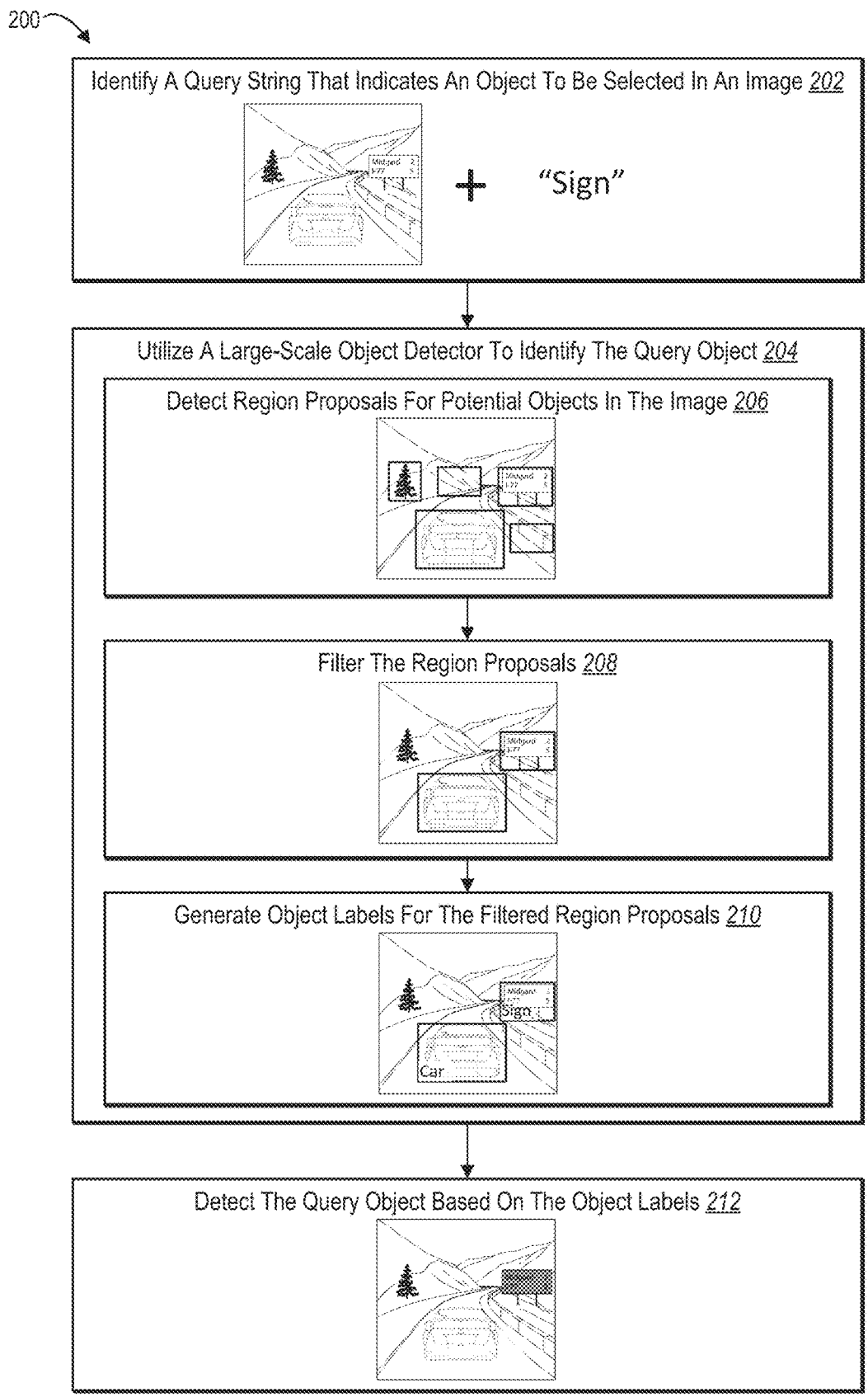
FIG. 2 illustrates a schematic diagram of a process of automatically detecting and selecting a query object in an image utilizing a large-scale object detector in accordance with one or more implementations.

Turning to the next figure, FIG. 2 provides an overview of utilizing the object selection system to automatically select an object in an image. In particular, FIG. 2 illustrates a series of acts 200 of automatically detecting a query object in an image utilizing a large-scale object detector in accordance with one or more implementations. For example, in various implementations, the object selection system 106 performs the series of acts 200. In some implementations, an image editing system and/or image editing application performs one or more of the acts included in the series of acts 200.

As shown in FIG. 2, the object selection system 106 performs an act 202 of identifying a query string that indicates an object to be selected in an image. For example, a user utilizes an image editing program to edit an image. While editing the image, the user desires a particular object to be selected within the image. Accordingly, the object selection system 106 provides the user with a graphical interface that enables the user to enter a query string requesting automatic selection of the object. The object selection system 106 can enable the user to provide the query string as typed text or spoken words that the object selection system 106 then converts to text. As shown in FIG. 2 with respect the act 202, the object selection system 106 can receive a query string that includes the query object of "sign" in connection with the image.

In response to detecting the query object, the object selection system 106 performs an act 204 of utilizing a large-scale object detector to identify the query object. In various implementations, the object selection system 106 can analyze the query object to determine that it does not correspond to a known object class. Accordingly, the object selection system 106 selects the large-scale object detector to detect the query object. Otherwise, if the object selection system 106 detects the object class of the query object, the object selection system 106 can utilize another object detection model (e.g., a specialist object class, known object class, or a category-based object class), as described above with respect to the object selection pipeline.

As shown in FIG. 2, the act 204 can include several sub-acts. For example, the act 204 includes a sub-act 206 of the object selection system 106 detecting region proposals for potential objects in the image. For instance, in one or more implementations, the object selection system 106 utilizes a region proposal model to discover potential objects in the image. Additional detail regarding utilizing a region proposal model is provided below with respect to FIGS. 4A-4C.

Additionally, the act 204 includes a sub-act 208 of the object selection system 106 filtering the region proposals. In one or more implementations, the object selection system 106 utilizes a concept mask model to filter the region proposals. For example, the object selection system 106 can generate a concept mask of the image and utilizes the concept mask model to generate the concept mask from the image and the query string indicating the query object. Then, the object selection system 106 can compare the region proposals with the concept mask to filter the region proposals by removing region proposals where the query object does not likely reside. In alternative implementations, the object selection system 106 can utilize another approach to filter the region proposals. In still other implementations, the object selection system 106 can omit the act of filtering. Additional detail regarding utilizing a concept mask model is provided below with respect to FIGS. 5A-5B.

As shown, the act 204 includes a sub-act 210 of the object selection system 106 generating object labels for the filtered region proposals. In one or more implementations, the object selection system 106 utilizes an auto tagging model to generate object labels (e.g., tags) to each of the remaining filtered region proposals. In alternative implementations, the object selection system 106 can tag or label the remaining region proposals with another type of tagging model. Additional detail regarding tagging region proposals is provided below with respect to FIGS. 6A-6C.

As shown, the series of acts 200 includes an act 212 of the object selection system 106 detecting the query object based on the object labels. In one or more implementations, the object selection system 106 can analyze the object labels with respect to the query object to detect the query object from the remaining filtered region proposals. In some implementations, the object selection system 106 can utilize a mapping table to identify alternative object terms for the query object (e.g., synonyms) to better match the query object to the object labels.

Additionally, in some implementations, the act 212 can include the object selection system 106 providing the selected query object within the image. For example, the object selection system 106 provides the image on a computing device with the query object automatically selected in response to receiving the query string. As shown, the image has the sign selected. In additional implementations, the object selection system 106 can automatically perform additional steps with the selected query object based on instructions detected in the query string, such as "remove the sign from the image."

The object selection system 106 can perform the acts 202-210 in a variety of orders. For example, the object selection system 106 can perform the sub-act 206 of detecting region proposals before, concurrently, or after generating the concept mask. In some implementations, the object selection system 106 omits the sub-act 208 of filtering the region proposals.

Figure 3A:
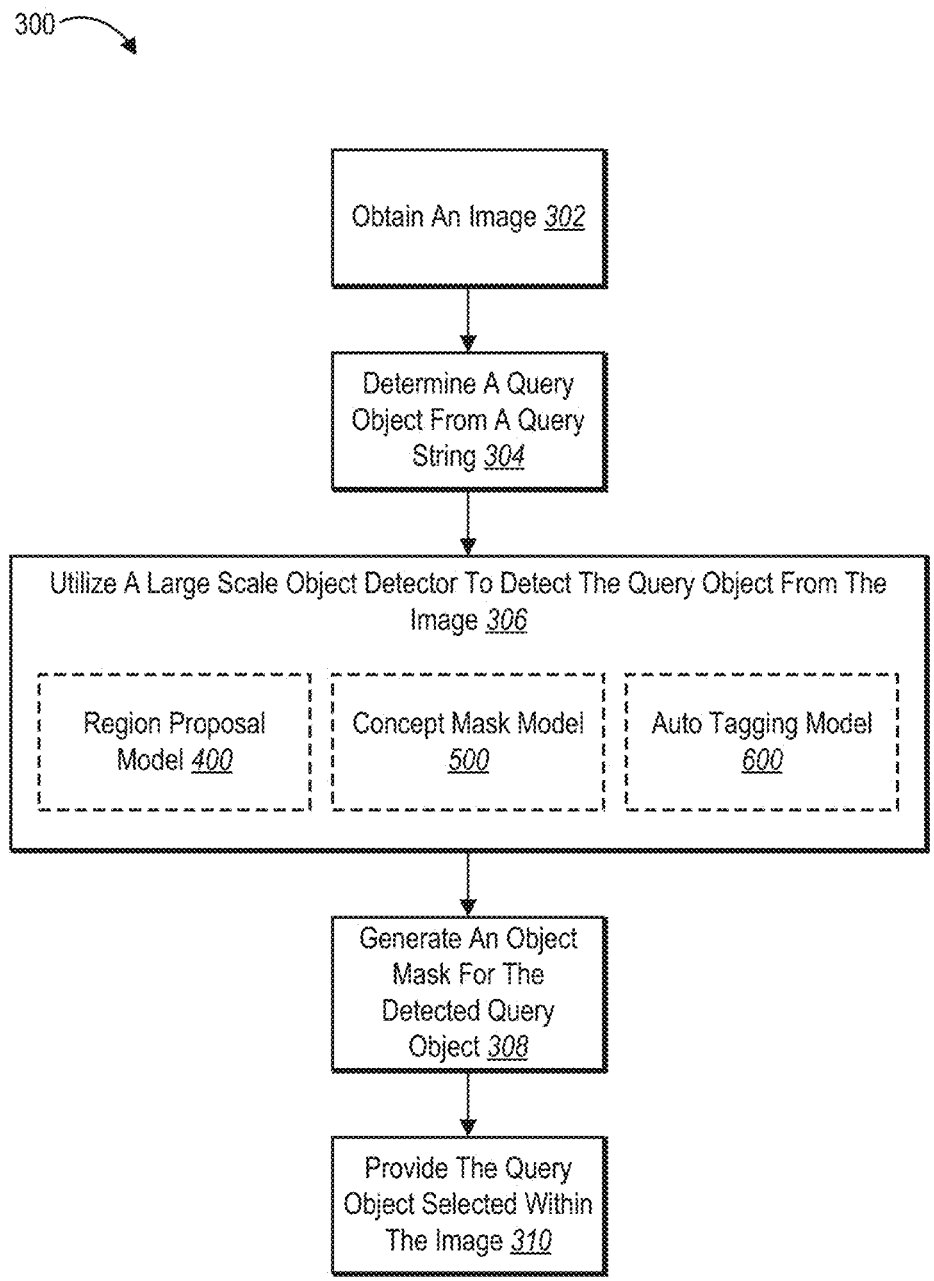
FIGS. 3A-3B illustrate flow charts of utilizing the large-scale object detector in accordance with one or more implementations.
Figure 3B:
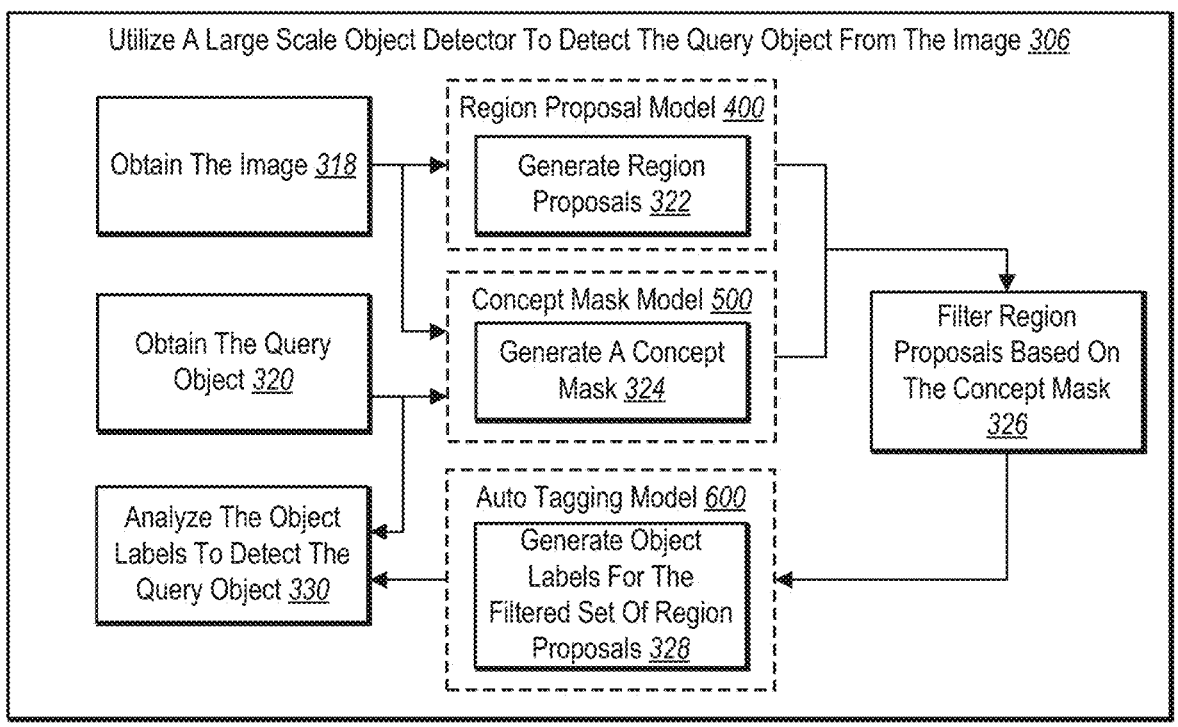

Turning to the next set of figures, FIGS. 3A-3B illustrate flow charts of utilizing the large-scale object detector to detect and select an object in accordance with one or more implementations. In particular, FIG. 3 illustrates a series of acts 300 of automatically detecting and selecting a query object of an unknown object class in an image utilizing a large-scale object detector. In various implementations, the object selection system 106 performs the series of acts 300. In some implementations, an image editing system and/or image editing application performs one or more of the acts included in the series of acts 300.

As shown in FIG. 3A, the series of acts 300 includes an act 302 of the object selection system 106 obtaining an image (i.e., a digital image). For example, the image is loaded into an image editing application on a computing device. In another example, the object selection system 106 is located on a server device and the object selection system 106 receives (e.g., downloads) the image from a client device, as described above with respect to FIG. 1.

In one or more implementations, the image is a single image. In alternative implementations, the image can be one of multiple images (e.g., a collection of images in a database or part of a video) that the object selection system 106 will analyze to find an object. Largely, the image includes one or more objects. For instance, the image can include objects of various types and classes.

In addition, the series of acts 300 includes an act 304 of the object selection system 106 determining a query object from a query string. For example, the object selection system 106 can provide an object selection interface (e.g., shown in FIG. 7A) where a user can enter one or more words indicating the query object that they would like the object selection system to automatically select. As mentioned above, in some embodiments, the object selection system 106 can provide alternative forms of user input, such as audio input telling the object selection system 106 to select an object in the image.

In various implementations, as part of the act 304, the object selection system 106 can also determine that the query object corresponds to an unknown object class. For example, the object selection system 106 can compare the query object to known object classes (e.g., known objects, specialist objects, and object categories) to determine whether the query object belongs to a known object class. In one or more implementations, the object selection system 106 compares the query object to a listing or lookup table to determine if an object detection model has been trained to specifically detect the object (making it a known object).

As shown, the series of acts 300 can include an act 306 of the object selection system 106 utilizing a large-scale object detector to detect the query object from the image. As shown, the act 306 includes a region proposal model 400 (e.g., a region proposal method and/or algorithm), a concept mask model 500 (e.g., a concept mask method and/or algorithm), and an auto tagging model 600 (e.g., an auto tagging method and/or algorithm). As described in further detail below with respect to FIG. 3B, the object selection system 106 can utilize the region proposal model 400, the concept mask model 500, and the auto tagging model 600 as part of the large-scale object detector to detect the query object from the image.

As shown, the series of acts 300 can include an act 308 of the object selection system 106 generating an object mask for the detected query object. For example, the object selection system 106 can provide the detected object to an object mask model (e.g., an object mask neural network), which generates an object mask (e.g., selection mask) for the query object. Indeed, in various embodiments, the object selection system 106 can provide an approximate boundary (e.g., a bounding box) to an object mask model, which generates a mask for the detected query object.

In generating an object mask for a detected query object, the object mask model can segment the pixels in the detected query object from the other pixels in the image. For example, the object mask model can create a separate image layer that sets the pixels corresponding to the detected query object to positive (e.g., a binary value of 1) while setting the remaining pixels in the image to negative (e.g., a binary value of 0). When this object mask layer is combined with the image, the negative portions of the object mask block all of the pixels in the image except for the pixels of the detected query object. In this manner, only the detected query object is visible. Indeed, the generated object mask can provide a segmentation that enables selection of the detected query object within the image.

The object mask model can correspond to one or more deep neural networks or models that select an object based on approximate boundary (e.g., bounding box) parameters corresponding to the object within an image. For example, in one or more embodiments, the object mask model is an object mask neural network that utilizes the techniques and approaches found in Ning Xu et al., "Deep GrabCut for Object Selection," published Jul. 14, 2017, the entirety of which is incorporated herein by reference. For instance, the object mask neural network can utilize a deep grad cut approach rather than a saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; P7753; and U.S. Pat. No. 10,192,129, "Utilizing Interactive Deep Learning To Select Objects In Digital Visual Media," filed Nov. 18, 2015, each of which is incorporated herein by reference in their entirety.

As shown, the series of acts 300 can include an act 310 of the object selection system 106 providing the query object selected within the image. For instance, the object selection system 106 can provide the selected query object within the image to the client device associated with the user. For example, the object selection system 106 can automatically select the query object within the image (e.g., using the object mask) for the user within the image editing application mentioned above in response to the object selection request.

As mentioned above, the act 306 includes the region proposal model 400, the concept mask model 500, and the auto tagging model 600 as part of the large-scale object detector. To further illustrate, FIG. 3B shows sub-acts 318-330 corresponding to the act 306 for detecting the query object using the large-scale object detector. In various implementations, FIG. 3B corresponds to acts performed by the object selection system 106 utilizing the large-scale object detector. For simplicity, FIG. 3B is described with respect to the large-scale object detector and its sub-components (i.e., the region proposal model 400, the concept mask model 500, and the auto tagging model 600) performing the sub-acts 318-330. However, in alternative implementations, the object selection system 106 can perform one or more of the sub-acts 318-330.

As shown, the act 306 includes a sub-act 318 of the large-scale object detector obtaining the image, which is described previously. As also shown, the large-scale object detector can provide the image to the region proposal model 400 and the concept mask model 500. In addition, the act 306 includes a sub-act 320 of the large-scale object detector obtaining the query object (e.g., the query object label or the object term indicating the query object from the query string). As illustrated, the large-scale object detector can provide the query object to the concept mask model 500 as well as utilize it to detect the query object within the image, as described below in the sub-act 330.

In addition, FIG. 3B shows that the act 306 includes a sub-act 322 of the large-scale object detector generating region proposals. In particular, the sub-act 322 can include the region proposal model 400 generating multiple region proposals within the image. For example, the region proposals are represented by unlabeled approximate boundaries (e.g., bounding boxes), where each approximate boundary encompasses a potential object discovered in the image.

In various implementations, the region proposal model 400 is trained to discover potential objects within the digital image. For example, the region proposal model 400 is a trained region proposal neural network. As mentioned previously, additional detail regarding utilizing a region proposal model is provided below with respect to FIGS. 4A-4C.

In addition, the act 306 includes a sub-act 324 of the large-scale object detector generating a concept mask. In particular, the sub-act 324 can include the concept mask model 500 generating a concept mask from the image and the query object label. For example, the concept mask model 500 analyzes the image based on the query object to generate an attention mask (i.e., concept mask) indicating possible locations or areas in the image where the query object may reside. As mentioned above, the concept mask can indicate areas in the image that can include potential objects, and in particular, the query object. For example, a concept mask can include positive pixels (e.g., a binary value of 1) where the query object is potentially detected and otherwise include negative pixels (e.g., a binary value of 0).

In one or more implementations, the concept mask model 500 is trained to detect potential objects in images based on visual-semantic embeddings and generate a corresponding concept mask. For example, the concept mask model 500 is a trained concept mask neural network. As mentioned previously, additional detail regarding utilizing a concept mask model is provided below with respect to FIGS. 5A-5B.

As shown, the act 306 can include a sub-act 326 of the large-scale object detector filtering region proposals based on the concept mask. In one or more implementations, the large-scale object detector compares the region proposals to the concept mask to filter out region proposals that do not contain the query object. For example, the large-scale object detector layers or aligns the region proposals (e.g., unlabeled bounding boxes) with the concept mask with respect to the image to determine if portions of the concept mask overlap with the region proposals. Indeed, the large-scale object detector can position the region proposals on the concept mask to determine the overlap between the two. In alternative implementations, the object selection system 106 maps the location of pixels for a region proposal with the corresponding pixel location of the concept mask to determine the type of pixels in the concept mask that overlap with pixels of the region proposal. In this manner, the large-scale object detector can remove or filter out false-positive region proposals.

In one or more implementations, the large-scale object detector can remove region proposals that do not satisfy an overlapping object threshold. For example, for each region proposal, the large-scale object detector determines if at least a minimum number of pixels in the region proposal overlaps with positive pixels of the concept mask. For instance, the overlapping object threshold can be based on relative values or fixed values, as described below.

To illustrate, in one or more implementations, upon overlapping the region proposal with the concept mask, the large-scale object detector determines if the number of positive pixels within the area of the approximate boundary (e.g., bounding box) of the region proposal meets or exceeds at least 30 percent of the pixels in a region proposal (or another value such as 10, 15, 20, 25, 40, 50, or 75 percent). If yes, the overlapping object threshold is satisfied and the large-scale object detector keeps the region proposal. Otherwise, the large-scale object detector removes the region proposal.

In some implementations, the large-scale object detector determines if the number of positive pixels within the area of the approximate boundary (e.g., bounding box) of a region proposal meets a minimum number. For example, if the region proposal overlaps with at least 100 or more positive pixels of the concept mask, the threshold is satisfied and the large-scale object detector keeps the region proposal. Again, the region proposals that do not satisfy the overlapping object threshold are filtered out or removed from the set of region proposals. In one or more implementations, the remaining region proposals can make up a subset of filtered region proposals.

As described above, the large-scale object detector can filter the region proposals based on the number of positive pixels from the concept mask that map to a region proposal. In alternative implementations, the large-scale object detector can utilize alternative approaches to filter out region proposals. For example, in one or more implementations, the large-scale object detector can filter out region proposals based on overlapping region proposals. For instance, if a region proposal is encompassed within a larger region proposal, the large-scale object detector can remove the inner region proposal. In some implementations, the large-scale object detector can remove a region proposal if a threshold amount (e.g., 50, 60, 75, or 80 percent) of the region proposal is overlapped by a larger region proposal.

In some implementations, rather than utilize the concept mask model 500, the large-scale object detector utilizes another type of unknown object class detection model. For example, the large-scale object detector utilizes an alternatively trained region proposal neural network to discover a second set of region proposals in the image. The large-scale object detector can then filter the first set of region proposals from the region proposal model 400 based on overlapping (e.g., mapping pixel locations) the two sets of region proposals and removing the region proposals from the first set that do not satisfy an overlapping object threshold, in a similar manner as described above. In addition to removing region proposals from the first set that do not map to region proposals in the second set, in some implementations, the large-scale object detector can add region proposals to the first set based on region proposals included in the second set.

As shown in FIG. 3B, the act 306 includes the sub-act 328 of the large-scale object detector generating object labels for the filtered set of region proposals. In particular, the sub-act 328 can include the auto tagging model 600 generating one or more labels for each region proposal in the remaining region proposals. In one or more implementations, the auto tagging model 600 is an auto tagging neural network trained to predict labels based on objects, concepts, and embeddings recognized in an image segment corresponding to a region proposal. As mentioned previously, additional detail regarding utilizing an auto tagging model is provided below with respect to FIGS. 6A-6C.

As also shown, act 306 includes the sub-act 330 of the large-scale object detector analyzing the object labels to detect the query object. In one or more implementations, the large-scale object detector compares the label of the query object (e.g., the word or object term used to indicate the query object in the query string) with each of the object labels to determine whether one or more object labels match the query object label. Upon identifying a matching object label, the large-scale object detector can determine that the corresponding region proposal includes the query object. In some implementations, the large-scale object detector identifies multiple instances of the query object in the image based on multiple object label matches.

If no object label match is found, the large-scale object detector can perform additional steps. To illustrate, in one or more implementations, the large-scale object detector can utilize a synonym mapping table. For example, the large-scale object detector replaces the query object label with a synonym, which is compared against the object labels to determine if a match exists. Additional detail regarding utilizing mapping tables is provided in U.S. patent application Ser. No. 16/800,415, which is referenced above in connection with FIG. 1B.

In various implementations, the large-scale object detector (or the object selection system 106) can rely on the input assumption that the query object included in the query string is included in the image. In other words, the large-scale object detector can act under the premise that a user would not request the selection of a query object that is not in the image. Accordingly, the large-scale object detector can perform additional acts to identify the query object.

For example, in a number of implementations, the large-scale object detector can eliminate or further filter out other known objects. If the query object is a "disc," the large-scale object detector can remove the region proposals labeled with "car" and "person." In another example, the large-scale object detector can utilize a machine-learning model to compare the query object label with the generated object labels of the remaining filtered region proposals within a vector or multi-dimensional space to determine one or more object labels that are closest or most similar to the query object label.

In one or more implementations, the large-scale object detector can detect and return some or all of the remaining region proposals. For example, if the number of region proposals is less than a predetermined or a user-defined number (e.g., 2, 3, 5, or 10), the large-scale object detector can return all of the region proposals. In this manner, the object selection system 106 selects and provides multiple detected objects to the user. Moreover, the object selection system 106 can allow the user to manually deselect objects that are not the query object, which is a simple task compared to manually selecting an object.

In some implementations, before performing additional actions, the large-scale object detector can validate the query object label with the user. For example, the large-scale object detector provides a graphical user interface to the user to verify that the query object is spelled correctly. In one or more implementations, the large-scale object detector can first determine that the label for the query object is not included in the dictionary, word database, or lookup table before prompting the user to verify the query object label. In alternative implementations, the large-scale object detector can prompt the user to provide synonyms of the query object label, which the large-scale object detector uses to detect the query object, as described above.

Upon detecting the query object, the large-scale object detector can provide the detected query object to an object mask model. For example, as detailed above, the large-scale object detector provides the approximate boundary (e.g., a bounding box) corresponding to the detected query object to the object mask neural network, which generates an object mask of the detected query object. The object selection system 106 can then select the query object using the object mask and provide the selected query object within the image, as previously described.

In one or more implementations, the object selection system 106 and/or the large-scale object detector can store or cache the region proposals, concept mask, and/or filtered set of region proposals (with or without labels). For example, the large-scale object detector stores the filtered set of region proposals with their corresponding labels in connection with the image. For instance, the large-scale object detector stores a hash or another unique image identifier along with the locations of the region proposals and their corresponding object labels. Then, for any subsequent query object request for the image where the query object corresponds to an unknown object (even at a later date), the large-scale object detector can skip to the act of comparing the query object label with the region proposal object labels to detect the query object. By skipping the acts that are more computationally intensive, the large-scale object detector can significantly increase computational efficiency and decrease processing time to detect a query object in subsequent query object requests.

Figure 4A:
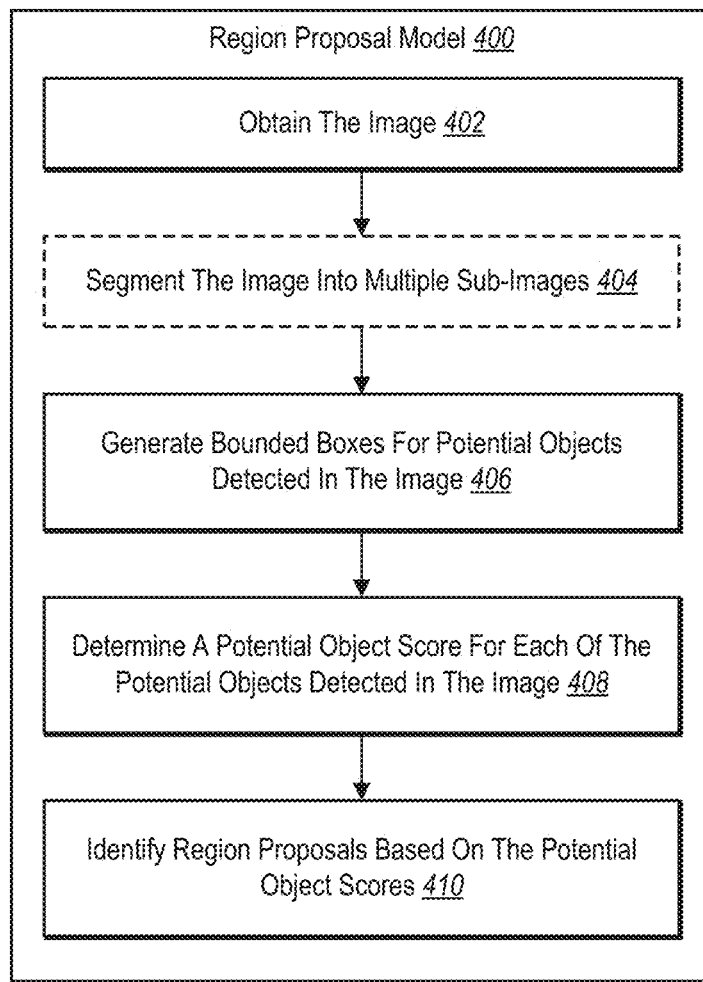
FIG. 4A illustrates a flow chart of a process of generating region proposals using a region proposal model in accordance with one or more implementations.
Figure 4B:
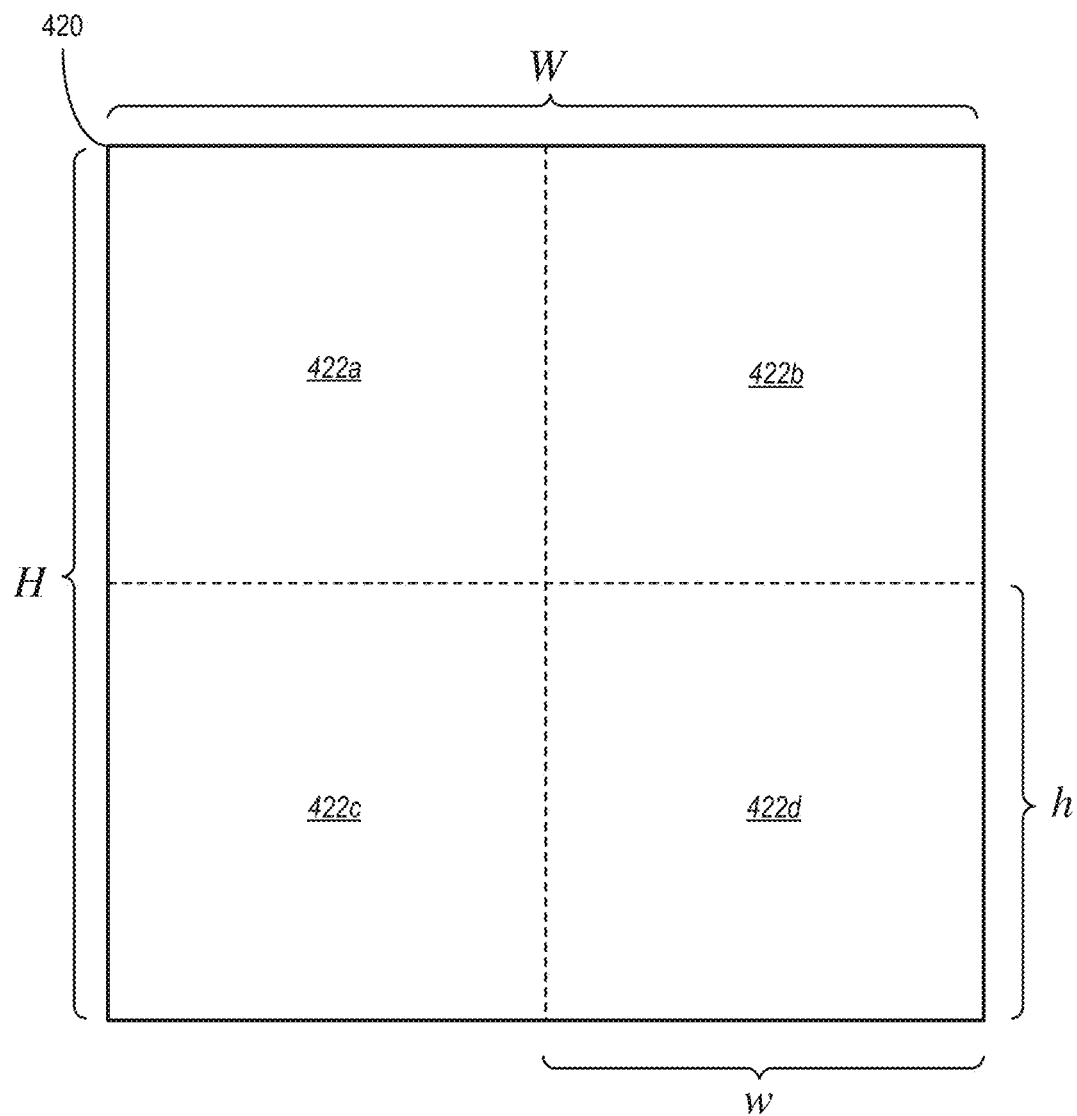
FIG. 4B illustrates a schematic diagram of segmenting an image into sub-images for individual processing by a region proposal model in accordance with one or more implementations.
Figure 4C:
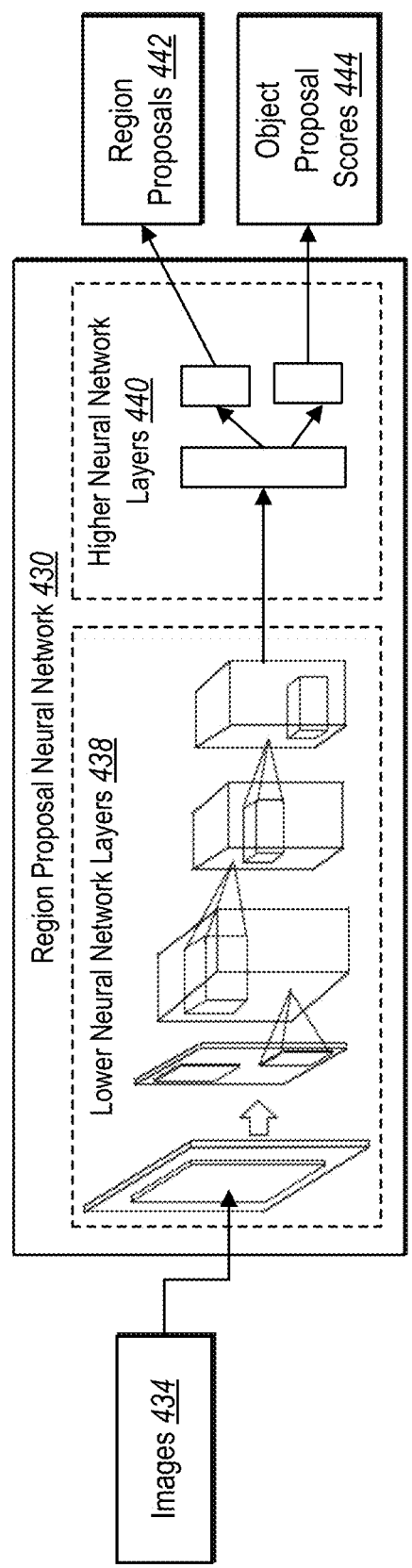
FIG. 4C illustrates a schematic diagram of a region proposal neural network in accordance with one or more implementations.
Figure 5A:
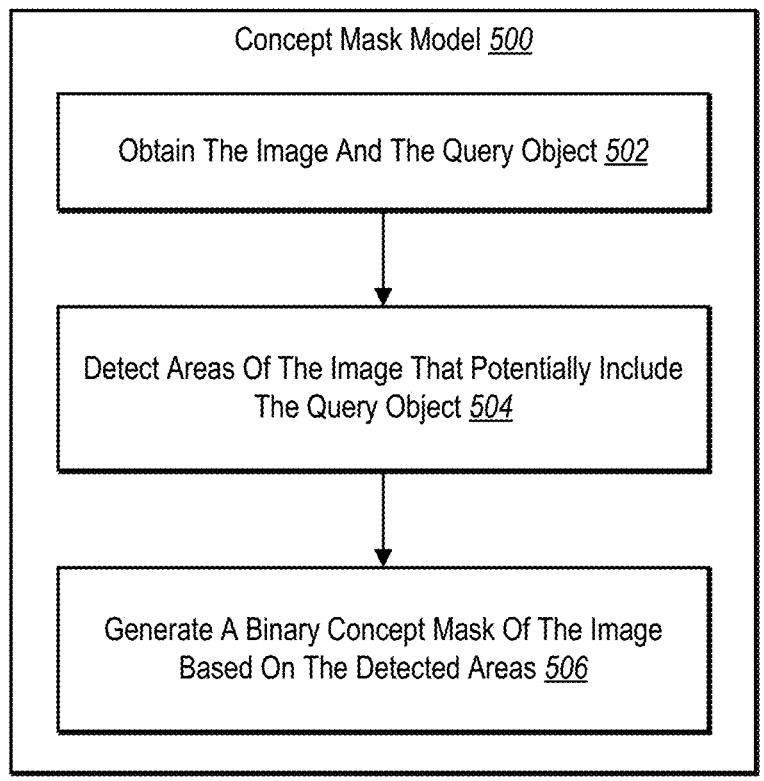
FIG. 5A illustrates a flow chart of a process of generating a concept mask utilizing a concept mask model in accordance with one or more implementations.
Figure 5B:
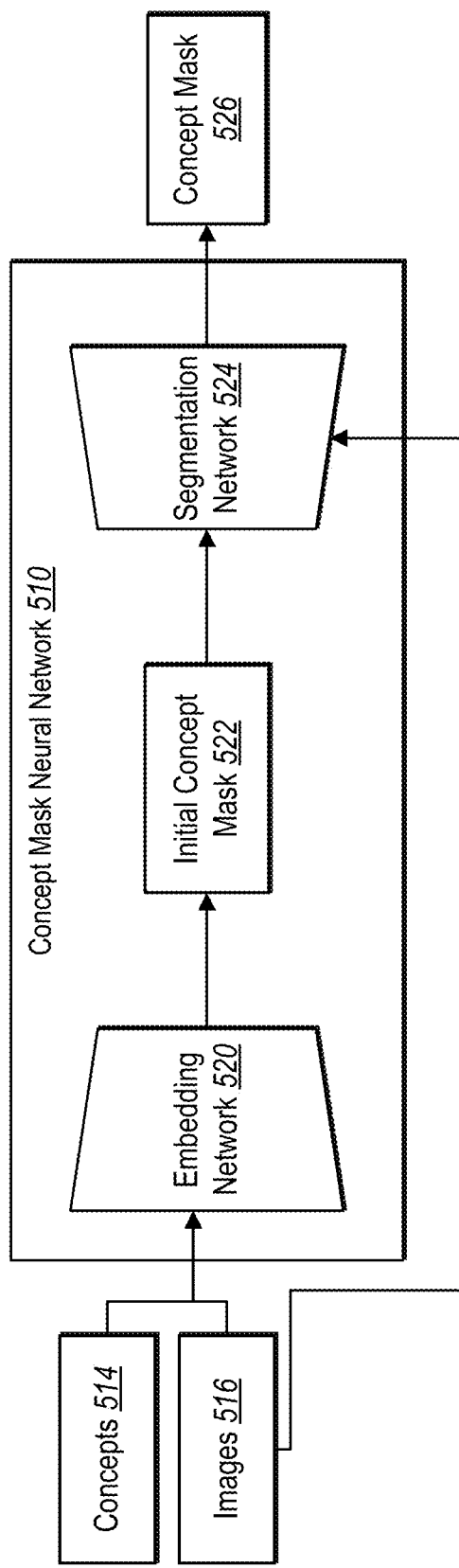
FIG. 5B illustrates a schematic diagram of a concept mask model in accordance with one or more implementations.
Figure 6A:
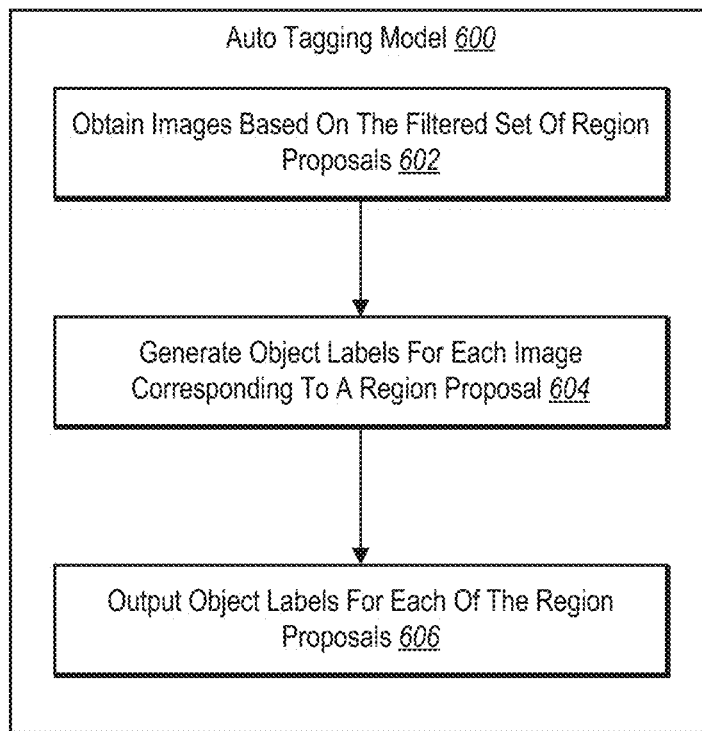
FIG. 6A illustrates a flow chart of a process of generating object labels for region proposals utilizing an automatic tagging model in accordance with one or more implementations.
Figure 6B:
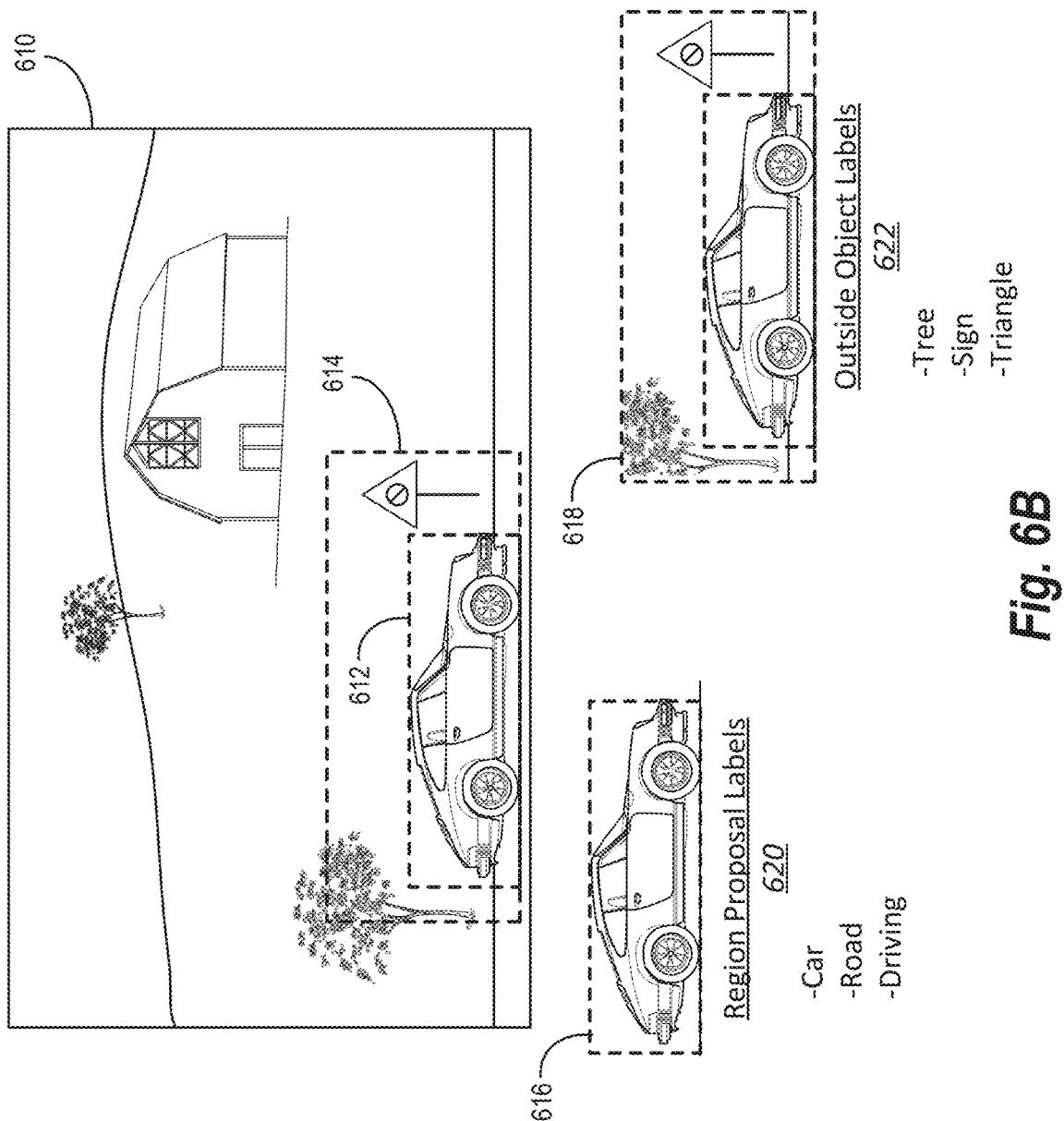
FIG. 6B illustrates a schematic diagram of tagged region proposals generated utilizing an automatic tagging model in accordance with one or more implementations.
Figure 6C:
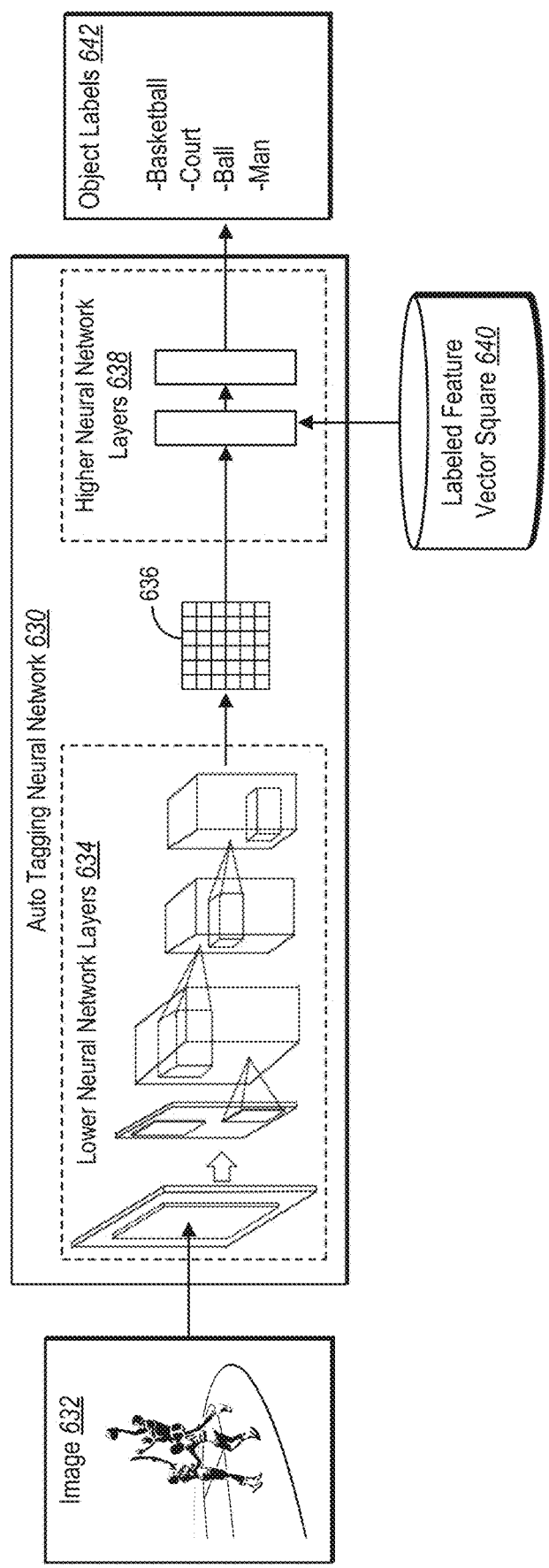
FIG. 6C illustrates a schematic diagram of an automatic tagging neural network in accordance with one or more implementations.

Turning now to FIGS. 4A-6C, additional detail and examples are provided with respect to components of the large-scale object detector. As mentioned above, FIGS. 4A-4C correspond to implementations of a region proposal model. FIGS. 5A-5B correspond to implementations of a concept mask model. FIGS. 6A-6C correspond to implementations of an auto tagging model. Using one or more of these components, the object selection system 106 can detect query objects that correspond to unknown object classes, as described further below.

To illustrate, FIGS. 4A-4C show schematic diagrams of a region proposal model 400 in accordance with one or more implementations. As mentioned above, the object selection system 106 can utilize the region proposal model 400 (e.g., a region proposal model that utilizes region proposal methods and/or algorithms) to detect region proposals within an image. Accordingly, FIG. 4A provides additional detail regarding one or more implementations of this process.

In one or more implementations, the region proposal model 400 can comprise a region proposal neural network. For example, the object selection system 106 utilizes the region proposal neural network to detect potential objects within an image. Accordingly, one or more of the acts described below with respect to the region proposal model 400 can be performed by a region proposal neural network. In alternative implementations, the region proposal model is a rule-based or heuristic-based model (e.g., non-machine-learning models).

As shown, the region proposal model 400 can perform an act 402 of obtaining the image. The object selection system 106 can provide the image to the region proposal model 400 as previously described. For example, the image is loaded within an image editing application and the object selection system 106 provides the region proposal model 400 with access to the image or a copy of the image.

In one or more implementations, the region proposal model 400 can perform an optional act 404 of segmenting the image into multiple sub-images, as shown. For example, to improve detecting of potential objects in the image, the object selection system 106 can divide the image into sub-images, and process each of the sub-images separately for potential objects. An example of dividing an image into sub-images is provided below in connection with FIG. 4B.

As shown, the region proposal model 400 can perform an act 406 of generating approximate boundaries (e.g., bounding boxes) for potential objects detected in the image. For instance, the object selection system 106 analyzes the image to discover areas in the image that potentially include objects. For each discovered potential object, the object selection system 106 can generate an approximate boundary encompassing the potential object. As noted above, an approximate boundary can include any polygon shape that encompasses or roughly encompasses a potential object. In one or more implementations, the object selection system 106 can generate bounding boxes.

As shown, the region proposal model 400 can perform the act 408 of determining a potential object score for each of the potential objects detected in the image. In one or more implementations, in connection with generating an approximate boundary (e.g., a bounding box) around a potential object, the object selection system 106 can also generate a corresponding potential object score (e.g., confidence score or objectness score) that indicates the likelihood that the bounding box includes an object. For example, the potential object scores can measure membership to a set of object classes vs. being part of the background of the image. As such, in some implementations, the region proposal neural network generates and outputs a potential object score in association with each approximate boundary (e.g., bounding box).

As shown, the region proposal model 400 can perform an act 410 of identifying region proposals based on the potential object scores. For example, in one or more implementations, the object selection system 106 performs a first filter process by identifying the region proposals (e.g., potential objects) with potential object scores that satisfy a potential object threshold, while dismissing those region proposals (e.g., potential objects) having potential object scores below the potential object threshold. In this manner, the object selection system 106 can filter the potential objects discovered in the image down to a first subset to focus on potential objects that have a higher likelihood of being the query object.

In some implementations, the potential object threshold is a fixed minimum threshold. For example, each potential object with a potential object score above x is selected (e.g., a potential object score of 0.5 or above out of a scale of 1.0). In various implementations, the potential object threshold is a relative measure, such as the top k potential object scores (e.g., the top 5, 10, or 15 potential object scores) or the top p percentage of potential object scores (e.g., the top 30%, 50%, or 75% potential object scores). The object selection system 106 can also utilize other measures for the potential object threshold.

In implementations where the object selection system 106 divides the image into sub-images (e.g., the optional act 404), the object selection system 106 can repeat the acts 406-410 for each of the sub-images. Further, the object selection system 106 can combine each of the identified region proposals. Indeed, the object selection system 106 can map the region proposals identified in each of the sub-images to their corresponding locations within the original image.

As mentioned above, FIG. 4B is a diagram of how the object selection system 106 can divide the image into multiple sub-images. To illustrate, FIG. 4B includes an image 420. While not shown for simplicity, the image can include multiple objects, object classes, and object categories, including unrecognized objects. As shown, the image 420 has height H and width W.

In various implementations, the object selection system 106 can divide the image 420 into sub-images. For example, as shown, the object selection system 106 can divide the image 420 into four sub-images at the four corners, shown as a first sub-image 422a, a second sub-image 422b, a third sub-image 422c, and a fourth sub-image 422d. Each of the sub-images includes sub-height h and sub-width w.

While the sub-images are shown as being equal in size, the object selection system 106 can divide one or more of the sub-images into different dimensions or sizes. Further, while four sub-images are shown, the object selection system 106 can divide the image 420 into any number of sub-images. For example, in some implementations, the number of sub-images is based on the dimensions or size of the image 420, such that larger images are split into more sub-images.

In one or more implementations, dividing the image 420 into sub-images enables the region proposal model to better detect smaller potential objects within the image 420. For example, an object in the image 420 may be too small to accurately detect when analyzing the entire image at once. However, when applying the same level of object discovery to a smaller image, the region proposal model may discover the potential object and/or assign a higher potential object score to the object.

As mentioned above, FIG. 4C illustrates one implementation of a region proposal model. In particular, FIG. 4C illustrates a region proposal neural network 430 in accordance with one or more implementations. In general, the region proposal neural network 430 can detect unknown or other objects in images. In one or more embodiments, the region proposal neural network 430 is a deep learning convolutional neural network (CNN). For example, in some embodiments, the region proposal neural network 430 is a region-based CNN (R-CNN). While FIG. 4C illustrates one implementation of a region proposal neural network, the object selection system 106 can utilize alternative implementations. For instance, another example of a region proposal network is found in S. Ren, K. He, R. Girshick, and J. Sun, *Faster R-CNN: Towards real-time object detection with region proposal networks*, NIPS, 2015, the entire contents of which is hereby incorporated by reference.

As shown in FIG. 4C, the region proposal neural network 430 includes lower neural network layers 438 and higher neural network layers 440. In general, the lower neural network layers 438 collectively form an encoder and the higher neural network layers 440 collectively form a decoder (or potential object detector). In one or more embodiments, the lower neural network layers 438 are convolutional layers that encode the images 434 into region proposal feature maps, which are outputted from the lower neural network layers 438 and inputted to the higher neural network layers 440. In various implementations, the higher neural network layers 440 can comprise fully-connected layers that analyze the region proposal feature maps and output the region proposal 442 (e.g., bounding boxes around potential objects) and the object proposal scores 444.

In particular, the lower neural network layers 438 can comprise convolutional layers that generate a region proposal feature map. To generate the region proposals 442, the region proposal neural network 430 processes the region proposal feature map utilizing a convolutional layer in the form of a small network that is slid across small windows of the region proposal feature map. The region proposal neural network 430 then maps each sliding window to a lower-dimensional feature. The region proposal neural network 430 then processes this feature using two separate heads that are fully connected layers. In particular, the first head can comprise a box-regression layer that generates the region proposals 442 and a box-classification layer that generates the object proposal scores 444. As noted above, for reach region proposal, the region proposal neural network 430 can generate a corresponding object proposal score 444. The region proposal neural network 430 can then perform a first filtering step, as discussed above, based on the object proposal scores, to generate a set of potential objects indicated by bounding boxes.

The object selection system 106 can then filter the region proposals to remove false-positive or redundant region proposals. For example, in one or more implementations, the object selection system 106 can filter the region proposals using a concept mask model. FIGS. 5A-5B illustrate a schematic diagram of a concept mask model 500 in accordance with one or more implementations. As also mentioned above, the object selection system 106 can utilize the concept mask model 500 to generate a concept mask for an image. Accordingly, FIG. 5A provides additional detail regarding one or more implementations of this process.

In one or more implementations, the concept mask model 500 is a machine-learning model trained to recognize a wide range of object-based concepts, object classes, and/or object categories. More specifically, the concept mask model 500 is trained to recognize visual-semantic embeddings in images. In this manner, the concept mask model 500 can identify a wide range of different object or object types.

As shown, the concept mask model 500 in FIG. 5A can perform an act 502 of obtaining the image and the query object (e.g., the query object label or indication of the query object from the query string). The object selection system 106 can provide the image and the query object to the concept mask model 500 as previously described. For example, the image is loaded within an image editing application and the object selection system 106 provides the concept mask model 500 with access to the image or a copy of the image.

In addition, as shown, the concept mask model 500 can perform an act 504 of detecting areas of the image that potentially include the query object. In one or more implementations, the act 504 can include analyzing the image to detect areas that include semantic features (e.g., object, classes, concepts, parts, attributes, scenes, and categories) with respect to the query object. For example, the object selection system 106 trains or otherwise obtains a machine-learning model that detects the semantic features, as mentioned above. In some implementations, the object selection system 106 utilizes a trained concept mask neural network to detect areas of the image that include potential objects, which can include the query object. An example of training a concept mask neural network is described further below with respect to FIG. 5B.

In various implementations, the act 504 includes determining the likelihood that a portion of the image (e.g., a group of pixels in the image) belong to the input concept (i.e., the query object). Because the act 504 can operates across a wide variety of concepts, the concept mask model 500 is often able to detect when pixels in the image correspond to the query object. Indeed, the number of detected concepts that can be detected in the act 504 outnumber the number of concepts used to train the concept mask model 500. In this manner, utilizing the concept mask model 500, the object selection system 106 can detect many more concepts than are possible by using other object detection models.

As shown, the concept mask model 500 can perform an act 506 of generating a binary concept mask of the image based on the detected areas. For example, in one or more implementations, the object selection system 106 generates an attention map (i.e., concept mask) describing the possible locations where the query object may reside. In particular, the concept mask can mark corresponding areas of the mask with positive pixels (e.g., a binary value of 1) where the query object potentially resides and mark other areas of the mask with negative pixels (e.g., a binary value of 0).

As mentioned above, FIG. 5B shows a concept mask neural network 510 in accordance with one or more implementations. In general, the concept mask neural network 510 generates a concept mask 526 (or an attention mask) of an image given an input concept (e.g., the query object). In one or more implementations, the concept mask neural network 510 includes one or more deep learning neural networks, such as a CNN.

As shown, the concept mask neural network 510 includes an embedding network 520 that generates an initial concept mask 522 and a segmentation network 524 that generates the concept mask 526. As mentioned above, the concept mask neural network 510 includes the embedding network 520. In various implementations, the embedding network 520 detects visual embeddings of an input concept within an input image and outputs an initial concept mask 522. In some implementations, the initial concept mask 522 is a low-resolution attention map indicating areas within the input image where the input concept may reside. Additionally, in one or more implementations, the embedding network 520 can include a refinement portion, such as a refinement layer or network.

In addition, the concept mask neural network 510 includes the segmentation network 524. As shown, the segmentation network 524 generates a concept mask 526 from the initial concept mask 522 outputted from the embedding network 520 and the input image. In implementations where the initial concept mask 522 is a low-resolution image, the segmentation network 524 can utilize the input image to generate a higher resolution version of the initial concept mask 522 (e.g., with a resolution matching the input image). In one or more implementations, the segmentation network 524 is a label-agnostic segmentation network that predicts a segmentation mask for the input concept, where the concept is derived from the initial concept mask 522 rather than from a label.

As illustrated, the object selection system 106 can provide concepts 514 (e.g., concept-based objects) corresponding to the images 516 to the embedding network 520. The embedding network 520 can utilize an input concept to detect visual-semantic embeddings of the concepts 514 in the images 516. Indeed, the embedding network 520 can roughly detect areas and potential objects in the images 516 where the concept 514 may reside. For each of the concepts 514 and the images 516, the embedding network 520 can generate an initial concept mask 522.

As also shown, the segmentation network 524 can generate a concept mask 526. In particular, the segmentation network 524 receives each of the initial concept masks and the images 516, utilizes the initial concept masks to identify areas in the images 516 that potentially include the concept 514, and outputs a concept mask 526 for each of the images 516. As mentioned above, the segmentation network 524 can utilize the initial concept masks rather than labels to identify the concept within the images 516 to generate the concept masks.

Thus, the object selection system 106 can utilize the concept mask neural network 510 to generate concept masks for input images and concepts. In particular, the object selection system 106 can provide the trained concept mask neural network 510 with an input image and a query object from a query string, and the concept mask neural network 510 can output a concept mask that includes areas within the input image where the query object may reside, as described above.

While FIG. 5B provides an example of a concept mask neural network, additional examples of concept mask neural networks are provided in Wang et at, *Concept Mask: Large-Scale Segmentation from Semantic Concepts*, published Aug. 18, 2018, the entire contents of which is hereby incorporated by reference.

As discussed above, having generated a concept mask 526, the object selection system 106 can utilize the concept mask 526 to filter the region proposals. In particular, the object selection system 106 can remove false-positive region proposals by filtering out region proposals whose intersection area with the concept mask 526 are less than a threshold. This filtering technique is effective because (1) concept mask may generate false-positive results but rarely generates false-negative predictions (i.e., the concept mask includes the correct locations most of the time); and (2) the concept mask model has very fast inference time. In addition, the initial region proposals sometimes does not include the correct location. To tackle this issue, the object selection system 106 can generate extra region proposals based on the concept mask. In particular, for any regions in the concept mask that are not covered by region proposals, the object selection system 106 can generate an approximate boundary (e.g., a bounding box) around that region. Thus, the object selection system 106 can utilize the concept mask as a verification step to remove the false-positives as well as to add extra proposals to improve recall. Upon filtering, and optionally adding region proposals, the object selection system 106 can utilize an auto tagging model to identify the region proposal(s) that correspond to the query term.

For example, FIGS. 6A-6C illustrate a schematic diagram of an auto tagging model 600 in accordance with one or more implementations. As also mentioned above, the object selection system 106 can utilize the auto tagging model 600 to generate object labels (i.e., tags) for each of the region proposals detected in an image. Accordingly, FIG. 6A provides additional detail regarding one or more implementations of this process.

As shown, the auto tagging model 600 in FIG. 6A can perform an act 602 of obtaining images based on the filtered set of region proposals. For example, the object selection system 106 can utilize the input image and the filtered region proposals to create a set of cropped images. To illustrate, in one or more implementations, for a given region proposal, the object selection system 106 crops the input image based on the size and location of the approximate boundary (e.g., bounding box) associated with the region proposal. The object selection system 106 can repeat this process for each of the filtered region proposals to create a set of cropped images to provide to the auto tagging model 600.

As also shown, the auto tagging model 600 can perform an act 604 of generating object labels for each image corresponding to a region proposal (e.g., cropped image). For example, the object selection system 106 utilizes image classification techniques to determine a list of object labels (i.e., tags) for each of the cropped images. In some implementations, the object selection system 106 also generates a confidence score for each object label. In these implementations, the object selection system 106 can remove object labels that do not satisfy an object label confidence threshold. In some implementations, the auto tagging model 600 generates object labels (e.g., tags) that correspond to objects, object classes, and object categories.

As shown, the auto tagging model 600 can perform an act 606 of outputting object labels for each of the region proposals. For example, the object selection system 106 adds metadata to a region proposal that indicates one or more labels determined for the region proposal. In some implementations, the object selection system 106 can rank the object labels for a region proposal based on the confidence score, where the object label with the most favorable confidence score is listed first.

In one or more implementations, the auto tagging model 600 can employ additional actions for generating object labels for an image (i.e., a cropped image). To illustrate, FIG. 6B shows an example of improving object label classification based on capturing additional context information. In particular, FIG. 6B includes an image 610 showing a car driving on a road with trees, a hill, and a barn in the background.

The object selection system 106 can identify a region proposal represented by the input approximate boundary 612 (e.g., bounding box 612) encompassing the car. As described above, the object selection system 106 creates a cropped image 616 of the region proposal based on the input bounding box 612 and provides it to the auto tagging model 600. However, in some instances and as shown, the cropped image 616 does not fully encompass an object within the image 610. Accordingly, the auto tagging model 600 can struggle to accurately tag objects within the cropped image 616 as the full image context of the object is not provided.

In one or more implementations, the object selection system 106 can enlarge the size of the input bounding box 612 as part of generating the cropped image 616. For example, as shown, the object selection system 106 enlarges the input bounding box 612 of the region proposal to create an enlarged bounding box 614 (i.e., enlargement of the approximate boundary), and as a result, an enlarged cropped image 618. In many implementations, enlarging the bounding box provides additional context information to the auto tagging model 600 to better recognize and classify detected objects within the enlarged cropped image 618.

In some cases, however, the enlarged cropped image 618 can introduce objects in addition to those found within the cropped image 616. To illustrate, the enlarged cropped image 618 includes a tree and a sign not included in the cropped image 616. These additional objects can lead to the auto tagging model 600 falsely adding tags to the region proposal for objects not within the region proposal (e.g., the enlarged cropped image 618).

To address the above issue, the object selection system 106 can use the enlarged cropped image 618 as guidance while also learning to differentiate between the input bounding box 612 and the enlarged bounding box 614. For example, the object selection system 106 can provide the enlarged cropped image 618 to the auto tagging model 600 along with the input bounding box 612.

In one or more implementations, the auto tagging model 600 can return a first set of object labels for tags detected within the input bounding box 612 and a second set of object labels for tags otherwise found in the enlarged cropped image 618. To illustrate, FIG. 6B also shows region proposal object labels 620 that include tags found within the input bounding box 612 and outside object labels 622 for other tags found in the enlarged cropped image 618.

In some implementations, the auto tagging model 600 returns only the region proposal object labels 620, which the object selection system 106 then uses to detect the query object, as previously described. In alternative implementations, the auto tagging model 600 returns both sets of object labels, but weights the outside object labels 622 with a lower confidence score. In some implementations, the auto tagging model 600 returns one or more of the object labels within the outside object labels 622 (e.g., based on confidence score) when the number of object labels in the region proposal object labels 620 is below a threshold number (e.g., less than three tags).

As mentioned above, FIG. 6C illustrates an auto tagging neural network 630 in accordance with one or more implementations. Indeed, in one or more implementations, the auto tagging neural network 630 outputs labels given an input image. For example, in one or more implementations, the auto tagging neural network 630 is a classifier algorithm that automatically identifies and selects tags to apply to an input image. In some implementations, the auto tagging neural network 630 is a CNN that utilizes clustering techniques to determine tags for an input image.

As shown, the auto tagging neural network 630 includes lower neural network layers 634 that can encode an input image 632 into a label feature vector 636. In addition, the auto tagging neural network 630 includes higher neural network layers 638 (e.g., fully-connected layers) that can classify the label feature vector 636 to identify one or more object labels. The auto tagging neural network 630 also outputs object labels for the input image 632.

As also shown, in one or more implementations, the higher neural network layers 638 utilize input from a labeled feature vector storage 640 to identify similarly labeled feature vectors to the label feature vector 636. For example, the higher neural network layers 638 identify objects labels from the similarly labeled feature vectors and apply the object labels to the input image 632. While the labeled feature vector storage 640 is shown as a separate component, in some implementations, the labeled feature vector storage 640, or information therein, is intergraded into the auto tagging neural network 630.

To illustrate, in one or more implementations, the auto tagging neural network 630 receives an input image 632 of men playing basketball on a court. The object selection system 106 generates a label feature vector 636 utilizing the encoder portion (i.e., the lower neural network layers 534) of the auto tagging neural network 630. Based on the label feature vector 636, the object selection system 106 determines similarly labeled feature vectors based on the classifier portion (i.e., the higher neural network layers 638) of the auto tagging neural network 630 and the labeled feature vectors in the labeled feature vector storage 640. In addition, the object selection system 106 identifies object labels 642 for the input image 632 from the labeled feature vectors, as previously described. To illustrate, FIG. 6C shows the auto tagging neural network 630 outputting object labels of "basketball," "court," "ball," and "man."

Additionally, in one or more embodiments, the object selection system 106 utilizes an image classification neural network to generate feature vectors from input images. In some implementations, the object selection system 106 or another system can train the auto tagging neural network 630 to extract and/or generate feature vectors from training data, in a similar manner as described above (e.g., utilizing a loss classification model and back propagation).

In some embodiments, the object selection system 106 utilizes the auto tagging neural network 630 to generate a feature vector for an image by extracting features (e.g., visual characteristics and/or latent attributes) in different levels of abstraction. Indeed, a neural network, such as a CNN, can generate feature vectors for an image by learning features and/or generating feature vectors for the features by utilizing neural network layers such as, but not limited to, one or more convolution layers, one or more activation layers (e.g., ReLU layers), one or more pooling layers, and/or one or more fully connected layers.

As mentioned above, the object selection system 106 can utilize a label feature vector 636 corresponding to an input image to generate a set of object labels for the image. In particular, the object selection system 106 can analyze the label feature vector 636 and labeled feature vectors from the labeled feature vector storage 640 (e.g., a hash table of labeled feature vectors) to identify labeled feature vectors similar to the label feature vector 636.

In some implementations, the object selection system 106 can compare distance values (e.g., within a Euclidean space) between the label feature vector 636 and each of the labeled feature vectors to identify similarly labeled feature vectors (e.g., utilizing cosine similarity). Indeed, the object selection system 106 can determine which labeled feature vectors are similar to the label feature vector 636 based on the distance value where a shorter distance value can indicate a stronger similarity between the feature vectors. Further, the object selection system 106 can utilize a threshold distance value to select the labeled feature vectors (e.g., select the labeled feature vectors that have a distance value that satisfies a threshold distance value).

In some embodiments, the object selection system 106 generates the set of object labels from the labeled feature vectors based on relevance (or confidence) scores. For instance, in various embodiments, the object selection system 106 utilizes (or selects) a threshold number of object labels from each similarly labeled feature vector based on a relevance score associated with the object labels to generate a set of object labels for the input image. In some cases, the object selection system 106 can select a top threshold number of object labels (e.g., the top five object labels) from each labeled feature vector based on their relevance scores.

Upon generating the set of object labels from labeled feature vectors that are similar to the label feature vector 636 corresponding to an input image, the object selection system 106 can associate the set of object labels with the image. For example, the object selection system 106 adds the set of object labels as metadata to the image. Indeed, the object selection system 106 can associate the generated set of object labels, with any other corresponding information such as confidence scores for the object labels, to the image. Having tagged each of the filtered region proposals, the object selection system 106 can then identify each region proposal that includes the query object (or a synonym) as a tag.

While FIG. 6C provides an example of utilizing an auto tagging neural network, additional examples of utilizing and training auto tagging neural networks are provided in U.S. Pat. No. 9,767,386, "Training A Classifier Algorithm Used For Automatically Generating Tags To Be Applied To Images," filed Jun. 23, 2015; and U.S. Pat. No. 10,235,623, "Accurate Tag Relevance Prediction For Image Search," filed Apr. 8, 2016, the entire contents of both patents are hereby incorporated by reference.

Turning now to FIGS. 7A-7G, a graphical example of the object selection system 106 utilizing the large-scale object detector. For example, FIGS. 7A-7G illustrate a graphical user interface showing a process of selecting a query object utilizing the large-scale object detector in accordance with one or more implementations. As shown, FIGS. 7A-7G include a client device 700 having a graphical user interface 702 that includes an image 704 (i.e., a digital image). The client device 700 can represent the client device 102 introduced above with respect to FIG. 1. For instance, the client device 700 includes an image editing application that implements the image editing system 104 having the object selection system 106. Also, the graphical user interface 702 in FIGS. 7A-7G can be generated by the image editing application.

Figure 7A:
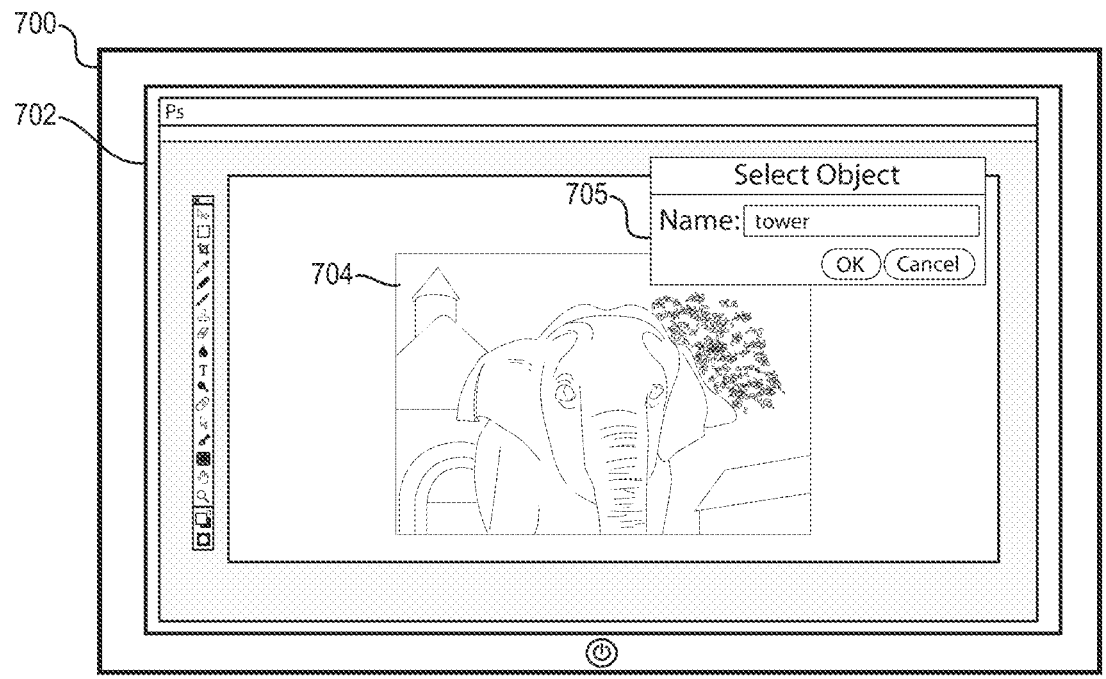
FIGS. 7A-7G illustrate a graphical user interface showing a process of selecting a query object utilizing the large-scale object detector in accordance with one or more implementations.

As shown in FIG. 7A, the graphical user interface 702 includes the image 704 within an image editing application. The image 704 shows an elephant in the foreground with a tree and buildings in the background, where one of the buildings has a tower on it. For ease in explanation, the image 704 is simplified and does not include additional objects or object classes.

The image editing system and/or the object selection system 106 can, in response to detecting a user selecting an option to have an object automatically selected, provide an object selection interface 705. For example, the object selection system 106 provides the object selection interface 706 as a selection tool within the image editing application.

As shown, the object selection interface 705 can include a text field where a user can enter a natural language object selection query in the form of a query string (i.e., "tower"). The selection interface 706 also includes selectable options. For example, the object selection interface includes a selectable element to confirm (i.e., "OK") or cancel (i.e., "Cancel") the object detection request. In some implementations, the object selection interface 705 includes additional elements, such as a selectable option to capture audio input from a user dictating the query string.

Based on detecting the query string from the object detection request, the object selection system 106 can detect and select the query object. For instance, as described above, the object selection system 106 can analyze the query object (i.e., "tower") and determine that it does not correspond to a known object class or category. Accordingly, the object selection system 106 can determine to utilize the large-scale object detector to detect the query object. In some implementations, even if the query object is recognized as a known object class, the object selection system 106 can utilize the large-scale object detector.

As mentioned above, the large-scale object detector can include a region proposal model, a concept mask model, and an auto tagging model. The object selection system 106 can utilize each of these models in detecting the query object. For example, as described above in connection with FIGS. 4A-4C, the object selection system 106 provides the image 704 to the region proposal model, which detects region proposals of potential objects within the image 704.

Figure 7B:
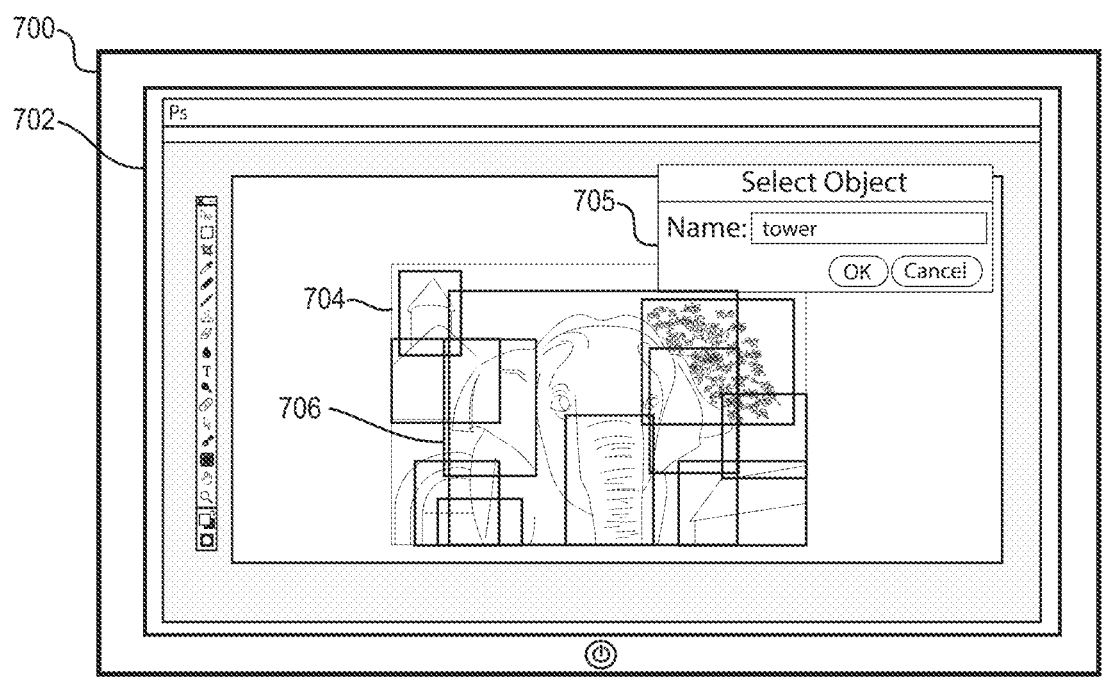

To illustrate, FIG. 7B shows the image 704 with multiple region proposals 706. As described above, the region proposal model detects potential objects within the image 704 and generates approximate boundaries (e.g., bounding boxes) for each potential object.

In addition, as described above, the object selection system 106 can provide the image 704 and the query object (i.e., the query object label of "tower") to the concept mask model. For example, the concept mask model generates a concept mask that indicates areas in the image 704 where the query object may reside. Indeed, the concept mask model generates a binary concept mask, with respect to FIGS. 5A-5B.

Figure 7C:
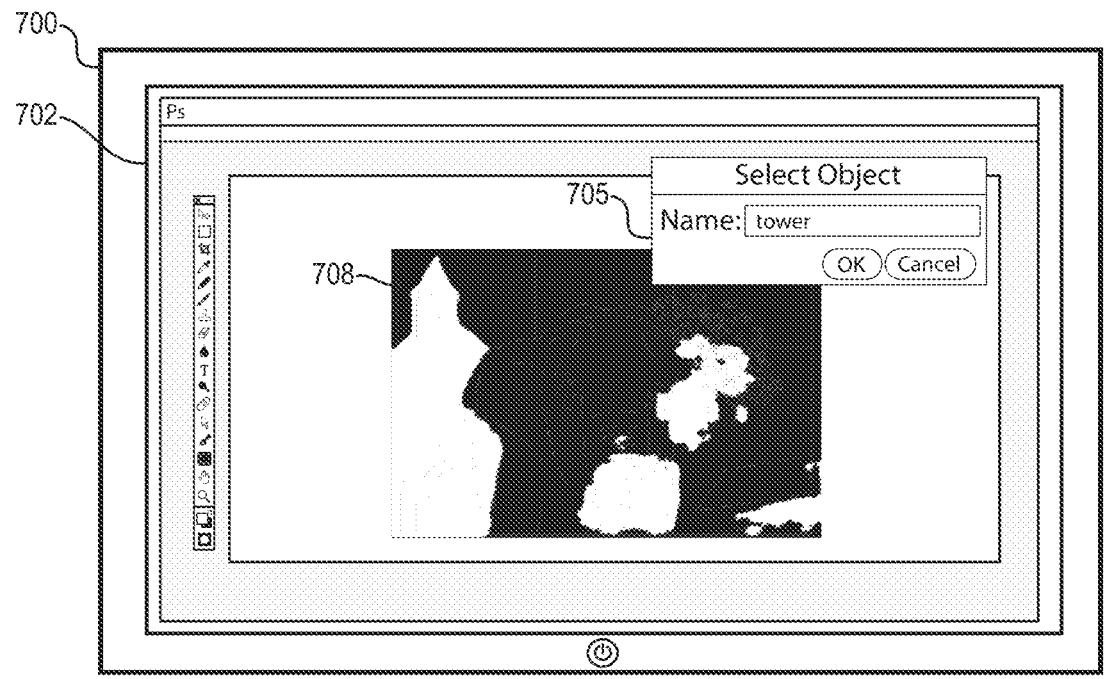

To illustrate, FIG. 7C shows a concept mask 708 of the image generated for the concept of "tower" (i.e., the query object). As shown the positive or white portions (i.e., the white pixels) of the concept mask 708 indicate areas where the tower may be located within the image. Similarly, the negative or black portions (i.e., the black pixels) show areas where the concept mask model did not detect potential objects that could be the tower.

As mentioned above, the object selection system 106 can filter out region proposals that have a low probability of including the query object. For example, the object selection system 106 can layer or align the region proposals with the concept mask to determine where potential objects detected by the region proposal model overlap with positive areas of the concept mask (e.g., where the query object may reside).

Figure 7D:
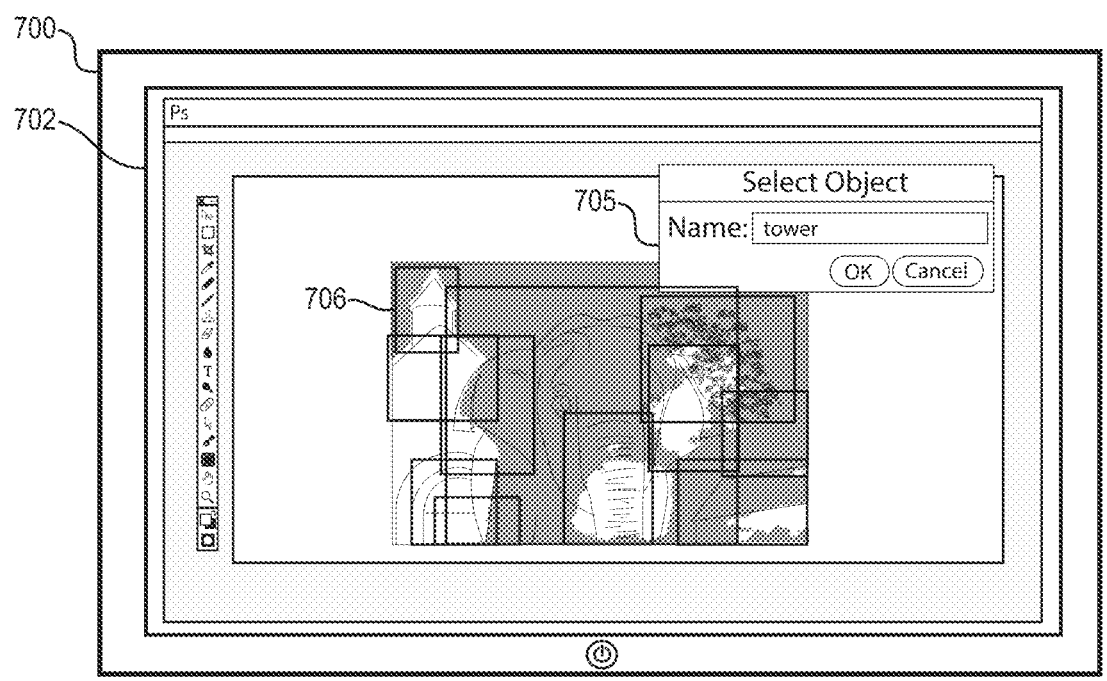

To illustrate, FIG. 7D shows the region proposals 706 overlaid on the concept mask 708.

Additionally, the object selection system 106 can remove region proposals that do not overlap positive areas of the concept mask to the satisfaction of an overlapping object threshold. Indeed, for each of the region proposals 706, the object selection system 106 can determine whether a threshold number of positive pixels reside within the region proposal. For example, in one or more implementations, the object selection system 106 determines if at least 25 percent of the region proposal includes positive (or white) pixels from the concept mask 708. As previously described, the object selection system 106 can create a filtered set of region proposals that include the remaining (e.g., non-removed) region proposals.

Figure 7E:
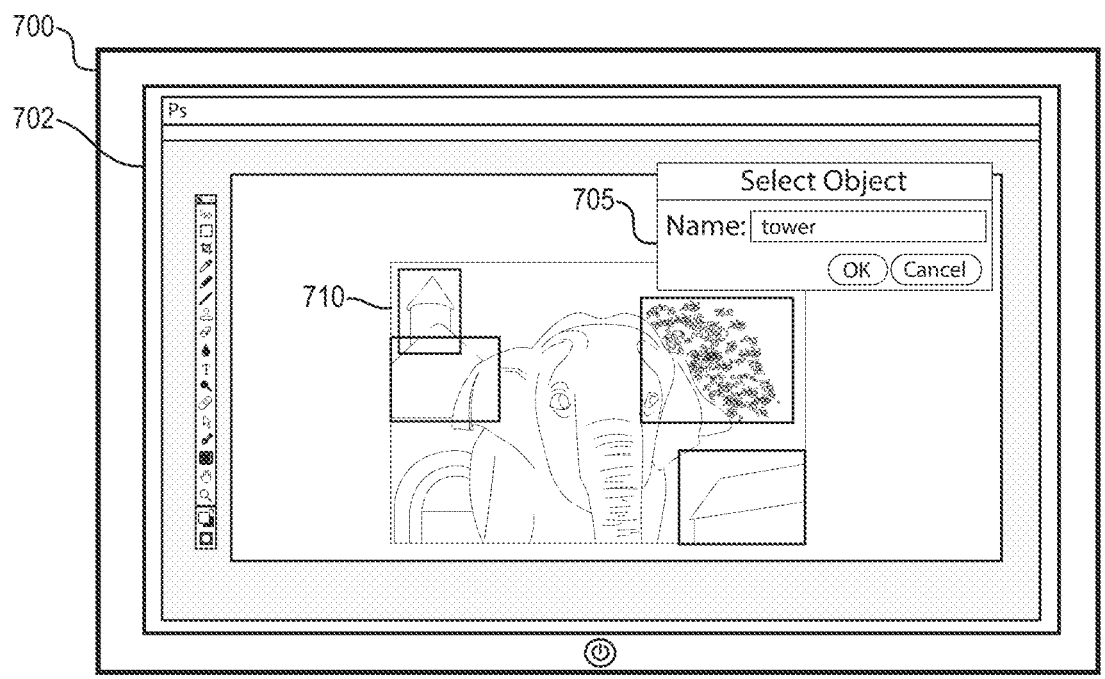

To illustrate, FIG. 7E shows the filtered region proposals 710 (e.g., a subset of region proposals). As shown, the filtered region proposals 710 are fewer in number than the original set of region proposal 706. As a result of the number of region proposals being reduced, the object selection system 106 needs fewer computing resources to analyze each of the remaining region proposals for the query object.

In one or more implementations, the object selection system 106 can add one or more region proposals to the region proposals 706 and/or the filtered region proposals 710 based on the concept mask 708. For example, if the object selection system 106 detects an area in the concept mask 708 with a large number of positive pixels, for which no region proposal exists, the object selection system 106 can generate a region proposal for that area. In some implementations, the object selection system 106 can first generate a concept mask, then generate region proposals with the region proposal model using the concept mask as input to indicate the location of the region proposals. By utilizing the concept mask, the object selection system 106 can not only remove false-positive region proposals, but it can also add extra region proposals to improve recall and object detection of the query object.

As described above, the object selection system 106 can detect the query object from the filtered region proposals 710. For example, in various implementations, the object selection system 106 provides cropped images corresponding to each of the filtered region proposals 710 to an auto tagging model, which outputs object labels for each of the filtered region proposals 710, as described above in connection with FIGS. 6A-6C.

Figure 7F:
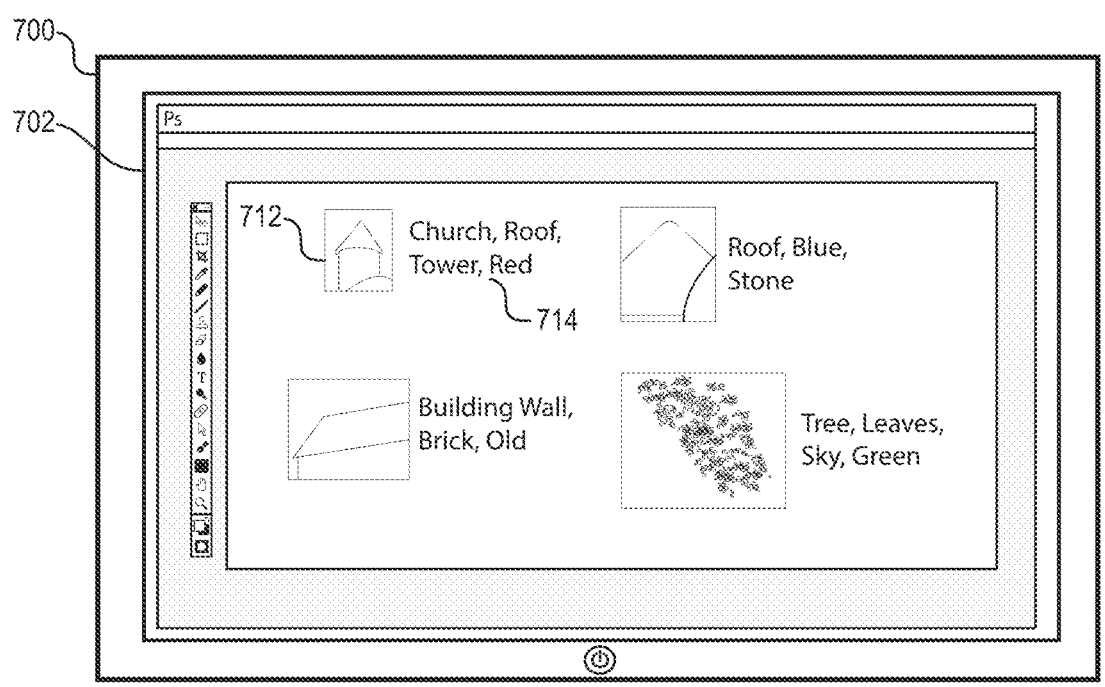

To illustrate, FIG. 7F shows each of the filtered region proposals 710 as cropped images 712, where each of the cropped images 712 is associated with a list of object labels 714. As shown, the object labels 714 can include objects (e.g., church, wall, tree), categories (e.g., roof, stone, sky), and attributes (e.g., red, blue, old). In additional implementations, the object labels 714 can also include actions, as disclosed above.

As explained above, based on the object labels 714, the object selection system 106 can determine if one or more of the filtered region proposals 710 includes the query object. In some implementations, the object selection system 106 matches the query object (i.e., "tower") to the object labels 714 for the filtered region proposals 710 (e.g., the cropped images 712). As shown, the top left cropped image of the cropped images 712 includes an object label of "tower" that matches the query object. In some implementations, as detailed above, if a match is not initially found, the object selection system 106 can perform additional actions, such as utilizing a mapping table to detect the query object from among the filtered region proposals 710.

Upon detecting the query object, the object selection system 106 can generate an object mask of the query object. For example, as described above, the object selection system 106 can provide the region proposal (e.g., the bounding box) of the query object to an object mask model to generate an object mask of the query object (i.e., the tower). Further, the object selection system 106 can apply the object mask to the image 704.

Figure 7G:
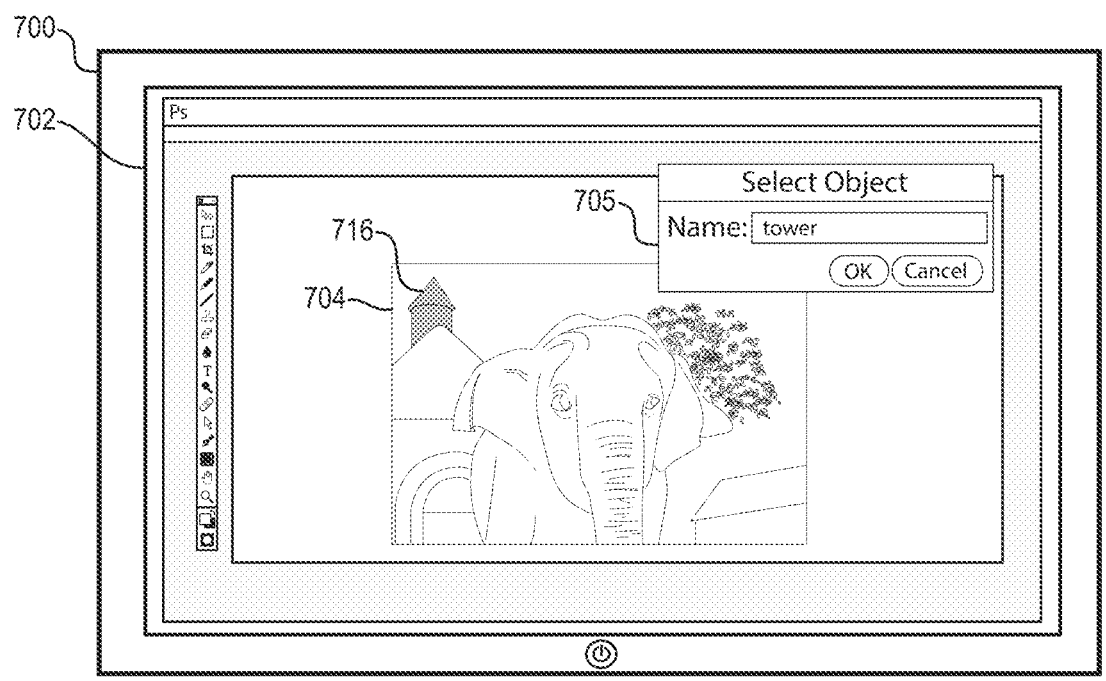

To illustrate, FIG. 7G shows the object selection system 106 selecting the tower 716 as the query object within the image 704. In particular, FIG. 7G shows the tower 716 selected with an object mask. In this manner, the user is able to easily modify the tower (e.g., remove it, change its color, or apply a filter) within the image 704 within the image editing application.

As detailed above, the object selection system 106 can provide the selected query object in response to the query object request where the user inputs a query string indicating the query object to be selected. In many implementations, the object selection system 106 provides the selected query object in response to the query object request without showing the intermediate actions associated with FIGS. 7B-7F. Indeed, in response to detecting the query object in FIG. 7A, the object selection system 106 can automatically skip to providing the result shown in FIG. 7G, while the intermediate actions are performed in the background. In alternative implementations, the object selection system 106 can show one or more of the intermediate actions to the user, such as showing one or more of the region proposals 706, the concept mask 708, of the filtered region proposals 710.

To evaluate the effectiveness of the large-scale object detector, evaluators performed a series of tests comparing various implementations of the object selection system. By way of context, evaluators tested various implementations of the object selection system 106 to determine if the object selection system 106 provided improvements over a baseline selection model. For the evaluations, the evaluators utilized the quality measurement of Intersection over Union (IoU) of an output mask compared to a ground truth mask for a query string having a query object. In particular, the evaluators ran a test dataset of approximately 1000 images and 2000 query strings.

For the implementations of the object selection system 106 described herein, the evaluators found substantial improvements over baseline models. For example, the Mean IoU went from 0.4343 to 0.4738 based on the added improvements of the large-scale object detector. In addition, the evaluators tested implementations of the object selection system 106 against other large-scale object detector models (i.e., methods) and found that the implementations of the object selection system 106 described herein achieved higher levels of accuracy and efficiency.

Figure 8:
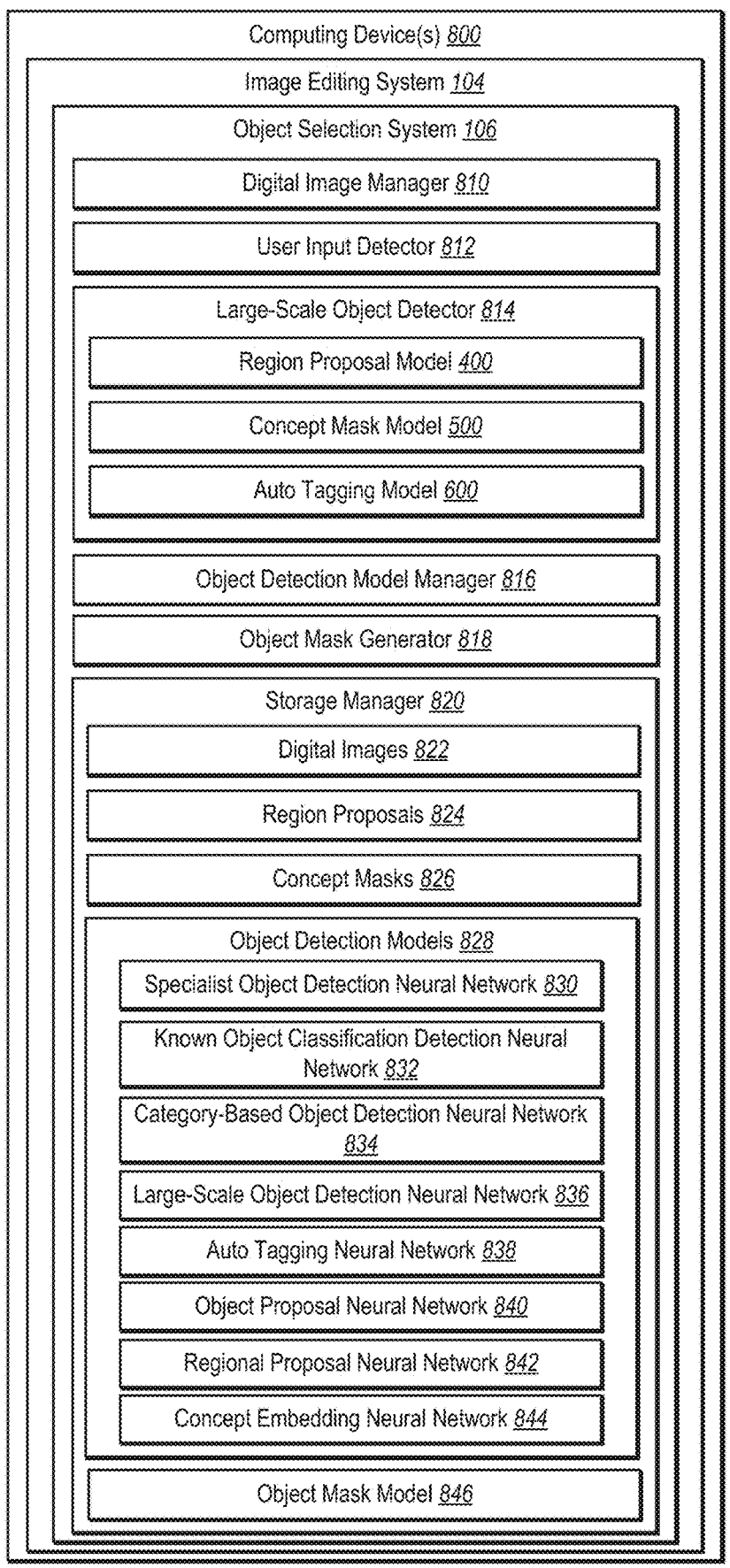
FIG. 8 illustrates a schematic diagram of the object selection system in accordance with one or more implementations.

Referring now to FIG. 8, additional detail is provided regarding capabilities and components of the object selection system 106 in accordance with one or more implementations. In particular, FIG. 8 shows a schematic diagram of an example architecture of the object selection system 106 implemented within the image editing system 104 and hosted on a computing device 800. The image editing system 104 can correspond to the image editing system 104 described previously in connection with FIG. 1.

As shown, the object selection system 106 is located on a computing device 800 within an image editing system 104. In general, the computing device 800 may represent various types of client devices. For example, in some implementations, the client is a mobile device, such as a laptop, a tablet, a mobile telephone, a smartphone, etc. In other implementations, the computing device 800 is a non-mobile device, such as a desktop or server, or another type of client device. Additional details with regard to the computing device 800 are discussed below as well as with respect to FIG. 10.

As illustrated in FIG. 8, the object selection system 106 includes various components for performing the processes and features described herein. For example, the object selection system 106 includes a digital image manager 810, a user input detector 812, a large-scale object detector 814 (which includes a region proposal model 400, a concept mask model 500, and an auto tagging model 600), an object detection model manager 816, an object mask generator 818, and a storage manager 820. As shown, the storage manager 820 includes digital images 822, region proposals 824, concept masks 826, object detection models 828 (which includes various neural networks), and an object mask model 846. Each of the components mentioned above is described below in turn.

As mentioned above, the object selection system 106 includes the digital image manager 810. In general, the digital image manager 810 facilitates identifying, accessing, receiving, obtaining, generating, importing, exporting, copying, modifying, removing, and organizing images. In one or more implementations, the digital image manager 810 operates in connection with an image editing system 104 (e.g., an image editing application) to access and edit images, as described previously. In some implementations, the digital image manager 810 communicates with the storage manager 820 to store and retrieve the digital images 822, for example, within a digital image database managed by the storage manager 820.

As shown, the object selection system 106 includes the user input detector 812. In various implementations, the user input detector 812 can detect, receive, and/or facilitate user input on the computing device 800 in any suitable manner. In some instances, the user input detector 812 detects one or more user interactions (e.g., a single interaction, or a combination of interactions) with respect to a user interface. For example, the user input detector 812 detects a user interaction from a keyboard, mouse, touch page, touch screen, and/or any other input device in connection with the computing device 800. For instance, the user input detector 812 detects user input of a query string (e.g., a natural language object selection query) submitted from an object selection interface requesting automatic selection of an object within an image. In addition, the user input detector 812 detects an additional user input from a mouse selection and/or a touch input to indicate an object location within the image, as described above.

As shown, the object selection system 106 includes the large-scale object detector 814. In one or more implementations, the large-scale object detector detects objects of known and unknown object classes or categories. As shown, the large-scale object detector 814 can utilize various components and models, such as the region proposal model 400, concept mask model 500, and the auto tagging model 600, each of which is described above with respect to FIGS. 4A-6C.

Indeed, the large-scale object detector 814 can generate region proposals and a concept mask for an input image and input query object, optionally filter the region proposals utilizing the concept mask to obtain a filtered set of region proposals, and generate object labels (e.g., tags) for the region proposals. Then, based on the object labels, the large-scale object detector 814 can detect which region proposal includes the query object, which can be selected and provided to the user in response to the query object request, as described above.

Further, in a number of implementations, the object detection model manager 816 can communicate with the storage manager 820 to store, access, and utilize the object detection models 828. In various implementations, the object detection models 828 include one or more specialist object detection models 830 (e.g., a sky detection neural network, face detection neural network, body/body parts detection neural network, skin detection neural network, clothes detect neural network, and waterfall detection neural network), known object class detection neural networks 832 (e.g., detects objects having classes learned from training data), category-based object detection neural networks 834 (e.g., detects uncountable objects such as the floor, water, and sand), and large-scale object detection neural networks 836 (e.g., detects objects of unknown object classes), each of which is described above.

In addition, the object detection model manager 816 can include one or more neural networks in connection with the above object detection neural networks to detect objects within an image, such as region proposal neural networks 838, concept mask neural networks 840, auto tagging neural networks 842, and concept embedding neural networks 844, each of which is described above. Indeed, the object detection model manager 816 can utilize various object detection neural networks within an object selection pipeline to detect objects within a query string, as previously described.

In addition, as shown, the object selection system 106 includes the object mask generator 818. In one or more implementations, the object mask generator 818 produces, creates, and/or generates accurate object masks from detected objects. For example, the object detection model manager 816 provides a boundary of an object (e.g., a detected query object) to the object mask generator 818, which utilizes the one or more object mask models 846 to generate an object mask of the detected object, as described above. As also explained above, in various implementations, the object mask generator 818 generates multiple object masks when multiple instances of the query object are detected.

Each of the components 810-846 of the object selection system 106 can include software, hardware, or both. For example, the components 810-846 can include one or more instructions stored on a computer-readable storage medium and executable by processors of one or more computing devices, such as a client device (e.g., a mobile client device) or server device. When executed by the one or more processors, the computer-executable instructions of the object selection system 106 can cause a computing device to perform the feature learning methods described herein. Alternatively, the components 810-846 can include hardware, such as a special-purpose processing device to perform a certain function or group of functions. In addition, the components 810-846 of the object selection system 106 can include a combination of computer-executable instructions and hardware.

Furthermore, the components 810-846 of the object selection system 106 may be implemented as one or more operating systems, as one or more stand-alone applications, as one or more modules of an application, as one or more plug-ins, as one or more library functions or functions that may be called by other applications, and/or as a cloud-computing model. Thus, the components 810-846 may be implemented as a stand-alone application, such as a desktop or mobile application. Additionally, the components 810-

846 may be implemented as one or more web-based applications hosted on a remote server. The components 810-846 may also be implemented in a suite of mobile device applications or "apps." To illustrate, the components 810-846 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Inc. in the United States and/or other countries.

FIGS. 1-8, the corresponding text, and the examples provide a number of different methods, systems, devices, and non-transitory computer-readable media of the object selection system 106. Additionally, the acts described herein may be repeated or performed in parallel with one another or parallel with different instances of the same or similar acts.

Figure 9:
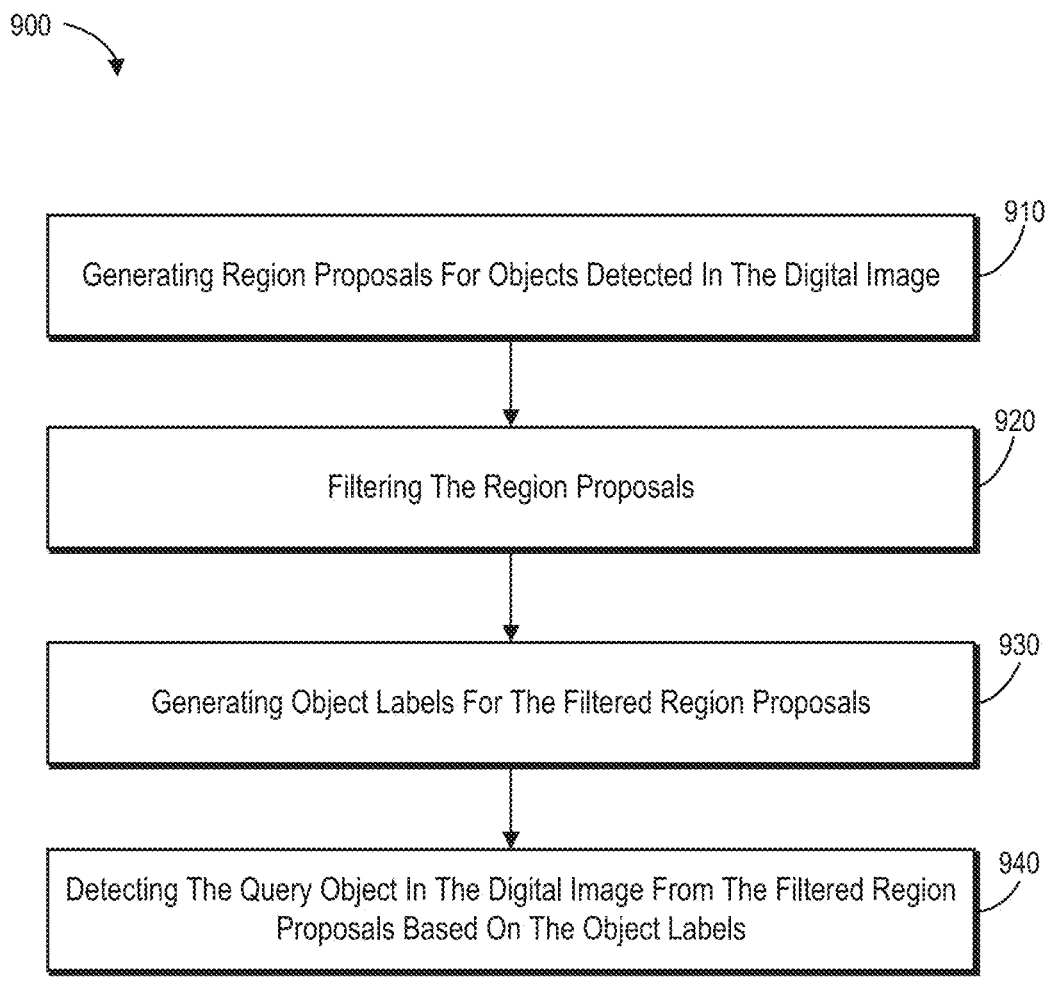
FIG. 9 illustrates a flowchart of a series of acts of utilizing a large-scale object detector to detect query objects in accordance with one or more implementations.

As mentioned, FIG. 9 illustrates a flowchart of a series of acts in accordance with one or more implementations. While FIG. 9 illustrates acts according to one implementation, alternative implementations may omit, add to, reorder, and/or modify any of the acts shown. The acts of FIG. 9 can be performed as part of a method. Alternatively, a non-transitory computer-readable medium can comprise instructions that, when executed by one or more processors, cause a computing device to perform the acts of FIG. 9. In some implementations, a system can perform the acts of FIG. 9.

To illustrate, FIG. 9 shows a flowchart of a series of acts 900 of utilizing a large-scale object detector to detect query objects in accordance with one or more implementations. In various implementations, the series of acts 900 is implemented on one or more computing devices, such as the client device 102, the server device 110, the client device 700, or the computing device 800. In addition, in some implementations, the series of acts 900 is implemented in a digital environment for creating or editing digital content (e.g., digital images). For example, the series of acts 900 is implemented on one or more computing devices (e.g., server devices) having memory that includes a digital image that includes objects; a query string indicating a query object to be automatically selected; and a large-scale object detector having a region proposal model, a concept mask model, and an auto tagging model. Indeed, in many implementations, the large-scale object detector is a method and/or an algorithm for large-scale object detection that utilizes smaller methods and/or algorithms (e.g., a region proposal method, a concept mask method), and an auto tagging method).

The series of acts 900 includes an act 910 of generating region proposals for objects detected in the digital image. In particular, the act 910 can involve generating, in response to receiving a query string to automatically select a query object within a digital image, a plurality of region proposals for objects detected in the digital image. In various implementations, the act 910 includes generating a plurality of region proposals for objects detected in the digital image utilizing a region proposal model in response to receiving a query string to automatically select a query object within a digital image.

In one or more implementations, the act 910 includes utilizing a region proposal model that generates approximate boundaries (e.g., bounding boxes) for each detected object within the digital image. In some implementations, the query object includes a noun included within the query string. In additional implementations, detecting the query object includes comparing the object labels generated for each filtered region proposal of the subset of filtered region proposals with the query string to determine a match between the noun and an object label of the object labels.

As shown, the series of acts 900 also includes an act 920 of filtering the region proposals. In particular, the act 920 can involve filtering the plurality of region proposals to identify a subset of filtered region proposals. In various implementations, the act 920 includes generating a concept mask of the digital image that indicates areas in the digital image that contain potential objects utilizing a concept mask model and/or filtering the plurality of region proposals based on the concept mask to identify a subset of filtered region proposals.

In one or more implementations, the act 920 includes utilizing a concept mask model that generates a concept mask including areas in the digital image that contain potential objects and/or potentially contain the query object. In example implementations, the act 920 includes determining a missing potential object within the digital image based on comparing the plurality of region proposals to the concept mask. In additional implementations, the act 920 includes adding an additional region proposal for the missing potential object to the plurality of region proposals. Indeed, in some implementations, the act 920 includes adding an additional region proposal to the plurality of region proposals based on the concept mask.

In some implementations, the act 920 includes comparing the concept mask to the plurality of region proposals to identify region proposals that satisfy an overlapping object threshold with the concept mask and selecting the region proposals within the plurality of region proposals that satisfy the overlapping object threshold with the concept mask to include within the subset of filtered region proposals.

In example implementations, the act 920 includes aligning the plurality of region proposals with the concept mask to identify region proposals that overlap potential objects identified in the concept mask to the satisfaction of an overlapping object threshold. In some implementations, the overlapping object threshold is satisfied when at least 30 percent of an approximate boundary (e.g., bounding box) associated with a region proposal overlaps the potential objects identified in the concept mask.

As shown in FIG. 9, the series of acts 900 further includes an act 930 of generating object labels for the filtered region proposals. In particular, the act 930 can include generating one or more object labels for each filtered region proposal of the subset of filtered region proposals utilizing an auto tagging model. In one or more implementations, the act 930 includes providing bounding boxes associated with the subset of filtered region proposals to the auto tagging model to generate the one or more object labels. In some implementations, the act 930 includes enlarging the area of the bounding boxes associated with the subset of filtered region proposals prior to the auto tagging model generating the one or more object labels.

As shown, the series of acts 900 also includes an act 940 of detecting the query object in the digital image from the filtered region proposals based on the object labels. In particular, the act 940 can include detecting the query object from the subset of filtered region proposals based on the one or more object labels. In various implementations, the act 940 includes detecting the query object based on comparing the object labels generated for each filtered region proposal of the subset of filtered region proposals with the query string.

In one or more implementations, the act 940 includes comparing the one or more object labels generated for each filtered region proposal of the subset of filtered region proposals to the query object in the query string to identify the query object within the digital image. In some implementations, the act 940 includes utilizing an object term mapping table to identify an alternative object term for the query object within the query string that matches an object label of the one or more object labels generated for each filtered region proposal of the subset of filtered region proposals.

The series of acts 900 can also include a number of additional acts. In one or more implementations, the series of acts 900 includes the acts of generating an object mask for the detected query object utilizing an object mask model to select the detected query object within the digital image and providing the selected query object within the digital image in response to receiving the query string. In example implementations, the series of acts 900 includes the acts of dividing the digital image into a plurality of sub-images and utilizing the region proposal model to identify the plurality of region proposals by detecting region proposals within each of the plurality of sub-images.

In some implementations, the series of acts 900 includes the acts of identifying the plurality of region proposals for objects detected within the digital image utilizing the region proposal model by detecting a plurality of potential objects within the digital image, generating a potential object score for each of the plurality of potential objects, and selecting each potential object from the plurality of potential objects that has a potential object score that satisfies a minimum potential object threshold score to include within the plurality of region proposals.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object selection system to create, execute, and/or modify the object selection pipeline as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be utilized in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is utilized.

Figure 10:
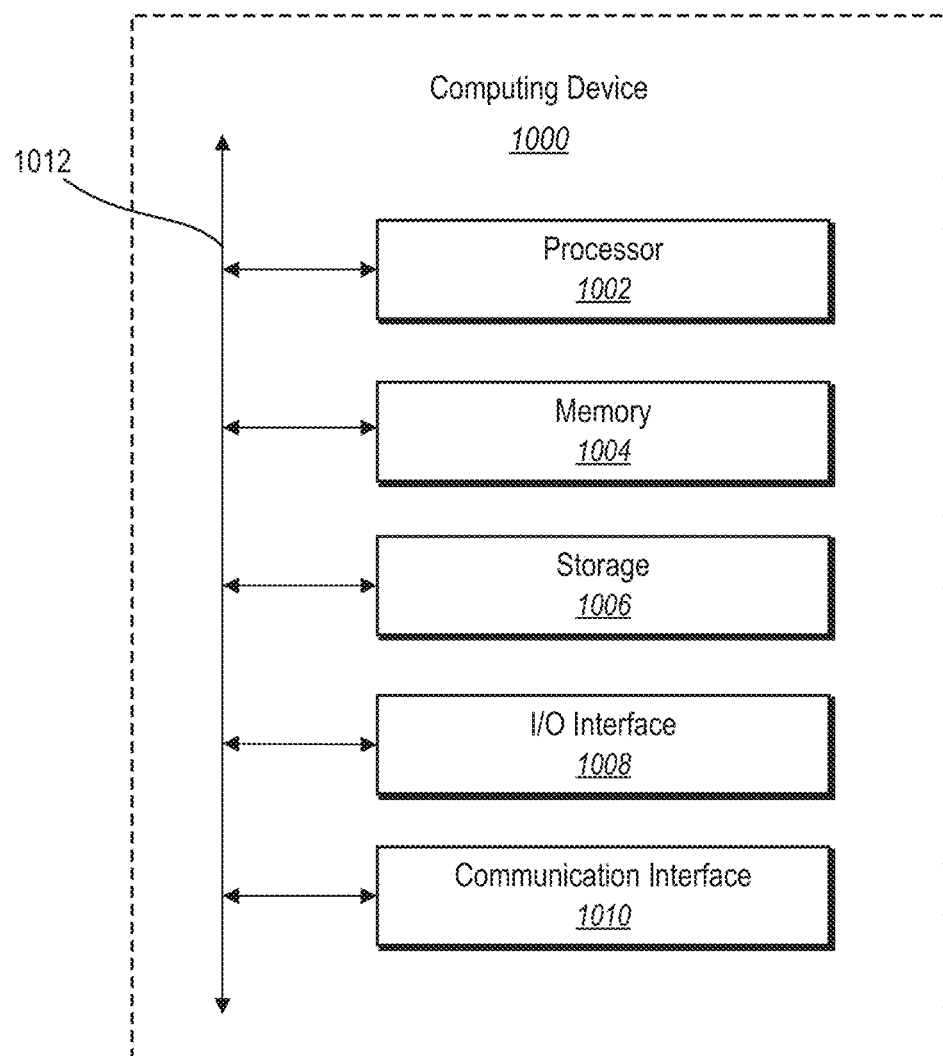
FIG. 10 illustrates a block diagram of an example computing device for implementing one or more implementations of the present disclosure.

FIG. 10 illustrates a block diagram of a computing device 1000 that may be configured to perform one or more of the processes described above. One will appreciate that one or more computing devices, such as the computing device 1000 may represent the computing devices described above (e.g., client device 102, the server device 110, the client device 700, or the computing device 800). In one or more implementations, the computing device 1000 may be a mobile device (e.g., a laptop, a tablet, a smartphone, a mobile telephone, a camera, a tracker, a watch, a wearable device, etc.). In some implementations, the computing device 1000 may be a non-mobile device (e.g., a desktop computer, a server device, a web server, a file server, a social networking system, a program server, an application store, or a content provider). Further, the computing device 1000 may be a server device that includes cloud-based processing and storage capabilities.

As shown in FIG. 10, the computing device 1000 can include one or more processor(s) 1002, memory 1004, a storage device 1006, I/O interfaces 1008 (i.e., input/output interfaces), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (e.g., user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of these I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   in response to receiving a query string indicating a query object to select within a digital image, generate a plurality of region proposals for potential objects in the digital image;
   filter the plurality of region proposals to identify a subset of filtered region proposals;
   generate one or more object labels for each filtered region proposal of the subset of filtered region proposals utilizing an auto tagging model; and
   detect the query object from the subset of filtered region proposals based on the one or more object labels.

2. The non-transitory computer-readable medium of claim 1, wherein the instructions that, when executed by the at least one processor, cause the computing device to generate the plurality of region proposals by utilizing a region proposal model that generates approximate boundaries for each detected object within the digital image.

3. The non-transitory computer-readable medium of claim 2, wherein the instructions that, when executed by the at least one processor, cause the computing device to filter the one or more region proposals from the plurality of region proposals to identify the subset of filtered region proposals by utilizing a concept mask model to generate a concept mask comprising areas in the digital image that potentially contain the query object.

4. The non-transitory computer-readable medium of claim 3, wherein the instructions that, when executed by the at least one processor, cause the computing device to filter the plurality of region proposals to identify the subset of filtered region proposals further by:
   comparing the concept mask to the plurality of region proposals to identify region proposals that satisfy an overlapping object threshold with the concept mask; and
   selecting, to include within the subset of filtered region proposals, the region proposals within the plurality of region proposals that satisfy the overlapping object threshold with the concept mask.

5. The non-transitory computer-readable medium of claim 4, further comprising instructions that, when executed by at least one processor, cause the computing device to add an additional region proposal to the plurality of region proposals based on the concept mask.

6. The non-transitory computer-readable medium of claim 4, wherein the instructions that, when executed by the at least one processor, cause the computing device to generate the one or more object labels for each filtered region proposal of the subset of filtered region proposals by processing approximate boundaries associated with the subset of filtered region proposals utilizing the auto tagging model to generate the one or more object labels.

7. The non-transitory computer-readable medium of claim 6, wherein the instructions that, when executed by the at least one processor, cause the computing device to detect the query object from the filtered region proposals by comparing the one or more object labels generated for each filtered region proposal of the subset of filtered region proposals to the query object in the query string to identify the query object within the digital image.

8. The non-transitory computer-readable medium of claim 6, wherein the instructions that, when executed by the at least one processor, cause the computing device to generate the one or more object labels for each filtered region proposal of the subset of filtered region proposals by enlarging the area of the approximate boundaries associated with the subset of filtered region proposals prior to the auto tagging model generating the one or more object labels.

9. The non-transitory computer-readable medium of claim 1, further comprising instructions that, when executed by at least one processor, cause the computing device to utilize an object term mapping table to identify an alternative object term for the query object within the query string that matches an object label of the one or more object labels generated for each filtered region proposal of the subset of filtered region proposals.

10. The non-transitory computer-readable medium of claim 1, further comprising instructions that, when executed by at least one processor, cause a computing device to:
   generate an object mask for the detected query object utilizing an object mask model to select the detected query object within the digital image; and
   provide the selected query object within the digital image in response to receiving the query string.

11. In a digital medium environment for creating or editing digital images, a computer-implemented method of selecting query objects, comprising:
   in response to receiving a query string to automatically select a query object within a digital image, generating a plurality of region proposals for objects detected in the digital image utilizing a region proposal model;
   generating a heat mask of the digital image that indicates areas in the digital image that potentially contain the query object;
   filtering the plurality of region proposals based on the heat mask to identify a subset of filtered region proposals;
   generating object labels for the subset of filtered region proposals utilizing an auto tagging model; and
   detecting the query object based on comparing the object labels generated for the subset of filtered region proposals with the query string.

12. The computer-implemented method of claim 11, wherein filtering the plurality of region proposals based on the heat mask to identify the subset of filtered region proposals comprises aligning the plurality of region proposals with the heat mask to identify region proposals that overlap with areas identified in the heat mask as potentially containing the query object to a satisfaction of an overlapping object threshold.

13. The computer-implemented method of claim 11, further comprising utilizing an object term mapping table to identify an alternative object term for the query object within the query string that matches an object label of the object labels generated for the subset of filtered region proposals.

14. The computer-implemented method of claim 11, further comprising adding an additional region proposal to the subset of filtered region proposals based on identifying an area in the heat mask that does not include a region proposal of the plurality of region proposals.

15. The computer-implemented method of claim 11, wherein:
- the query object comprises a noun included within the query string; and
- detecting the query object comprises comparing the object labels generated for the subset of filtered region proposals with the query string to determine a match between the noun and an object label of the object labels.

16. The computer-implemented method of claim 11, wherein a large-scale object detector comprises the region proposal model, a concept mask model, and the auto tagging model.

17. A system comprising:
- one or more memory devices comprising:
  - a digital image comprising a plurality of objects;
  - a query string indicating a query object to be automatically selected;
  - a large-scale object detector comprising a region proposal model, a concept mask model, and an auto tagging model; and
  - a concept mask of the digital image that indicates areas in the digital image where the query object potentially resides generated by the concept mask model; and
- one or more server devices configured to cause the system to:
  - in response to receiving the query string, utilizing the region proposal model to identify a plurality of region proposals for objects detected within the digital image;
  - determine a missing potential object within the digital image based on comparing the plurality of region proposals to the concept mask;
  - add an additional region proposal for the missing potential object to the plurality of region proposals;
  - generate one or more object labels for the plurality of region proposals utilizing an auto tagging model; and
  - detect the query object from the plurality of region proposals based on comparing the query string with the object labels generated for the plurality of region proposals.

18. The system of claim 17, further comprising the one or more server devices configured to cause the system to:
- divide the digital image into a plurality of sub-images; and
- utilize the region proposal model to identify the plurality of region proposals by detecting region proposals within each of the plurality of sub-images.

19. The system of claim 17, wherein the one or more server devices are configured to cause the system to identify the plurality of region proposals for objects detected within the digital image utilizing the region proposal model by:
- detecting a plurality of potential objects within the digital image;
- generating a potential object score for each of the plurality of potential objects; and
- selecting each potential object from the plurality of potential objects that has a potential object score that satisfies a minimum potential object threshold score to include within the plurality of region proposals.

20. The system of claim 19, further comprising the one or more server devices configured to cause the system to filter the one or more of the plurality of region proposals based on the concept mask to identify a subset of filtered region proposals, and wherein:
- generating the one or more object labels comprises generating the one or more object labels for each filtered region proposal of the subset of filtered region proposals; and
- detecting the query object comprises detecting the query object based on comparing the object labels generated for each filtered region proposal of the subset of filtered region proposals with the query string.

* * * * *